Jan. 16, 1962 R. TAYNTON 3,016,540
WAFER FEED AND POSITIONING MECHANISM FOR STAPLING MACHINE
Filed June 26, 1959 12 Sheets-Sheet 1

INVENTOR
RALPH TAYNTON
W. Robert Baylor
BY Hurwitz & Rose
ATTORNEYS

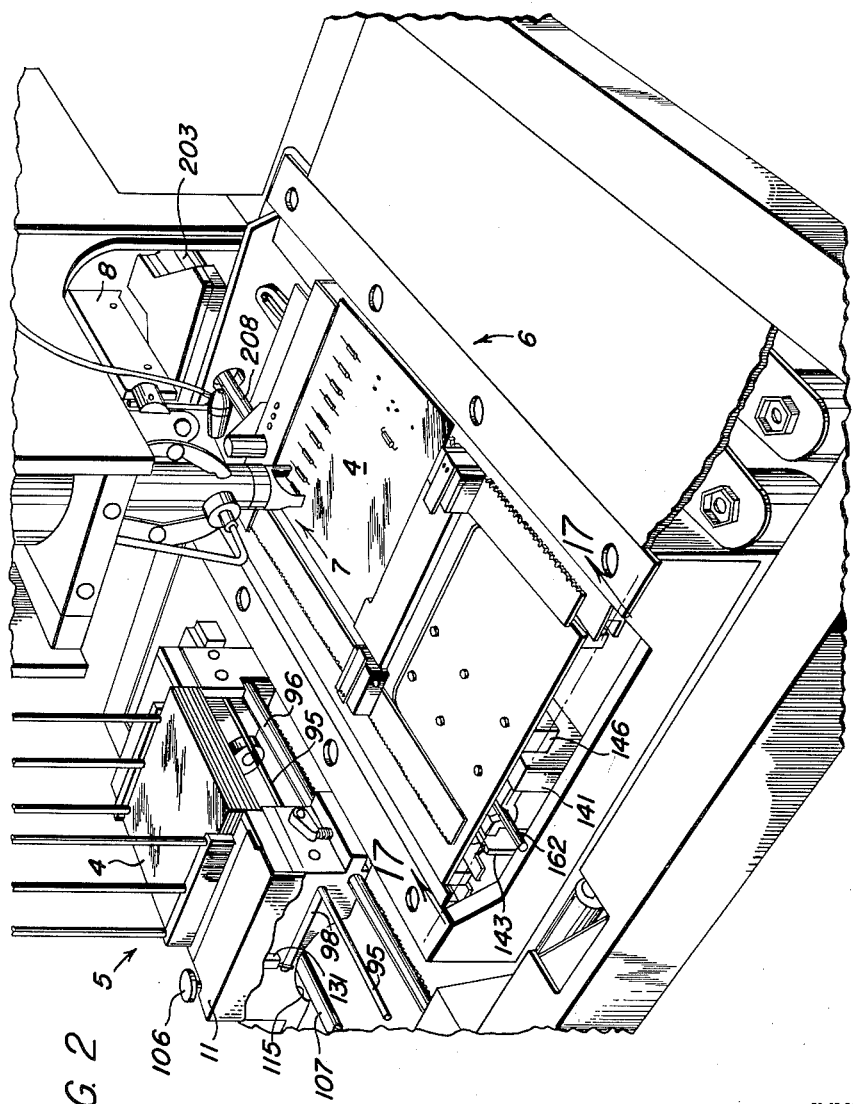

Jan. 16, 1962 R. TAYNTON 3,016,540
WAFER FEED AND POSITIONING MECHANISM FOR STAPLING MACHINE
Filed June 26, 1959 12 Sheets-Sheet 3
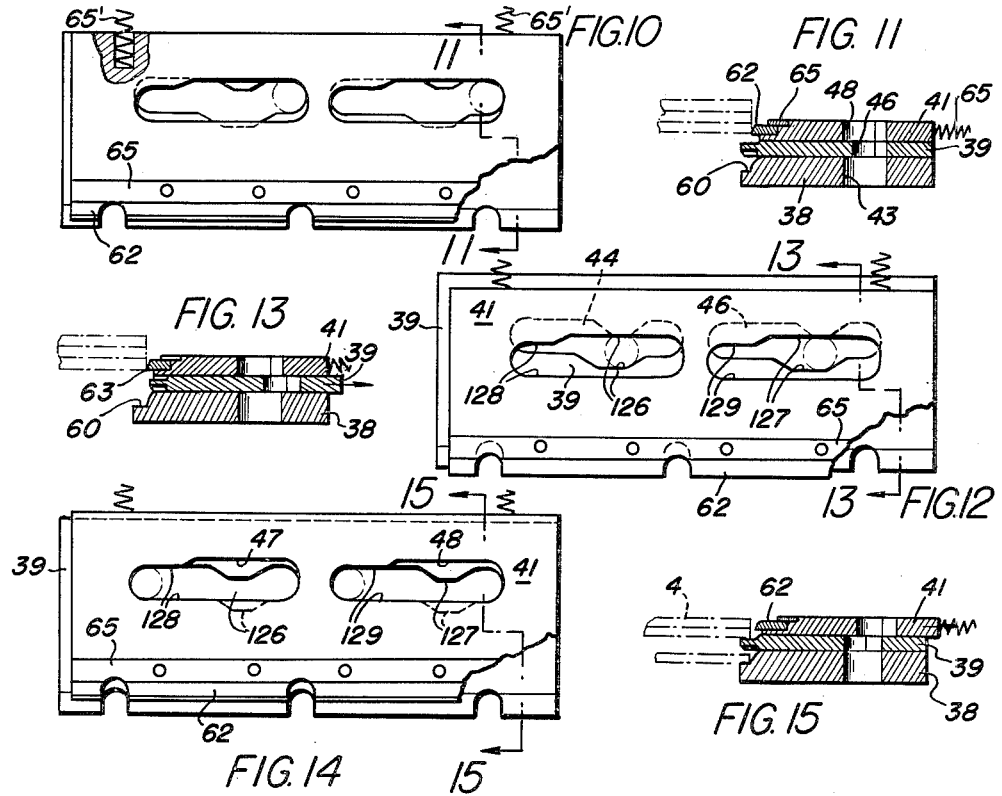
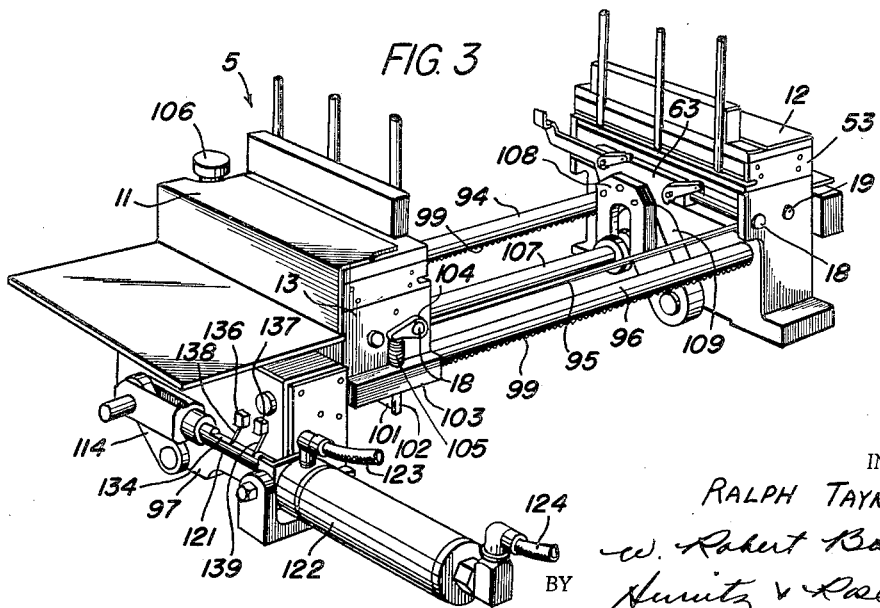
INVENTOR
RALPH TAYNTON
BY
ATTORNEYS

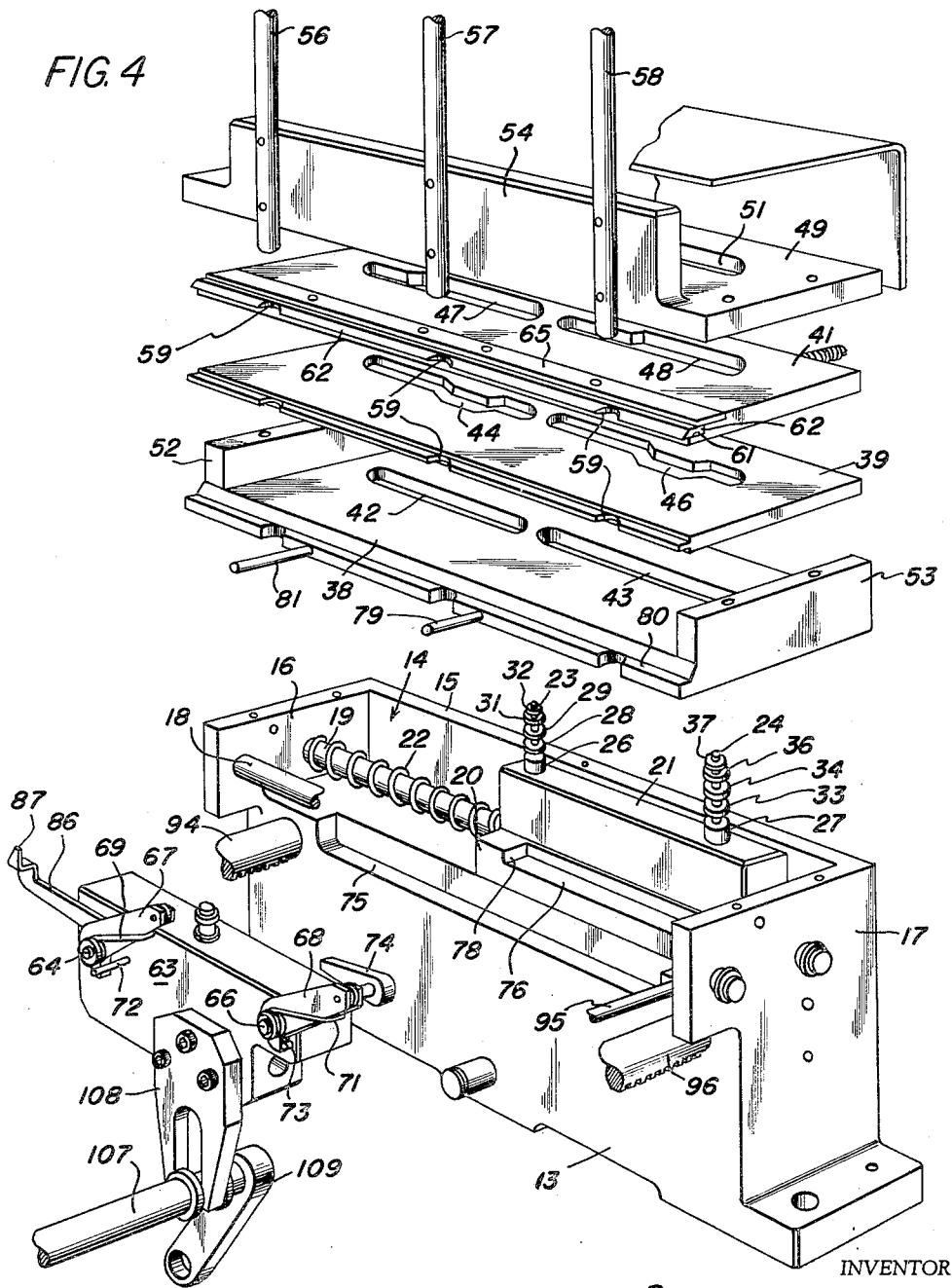

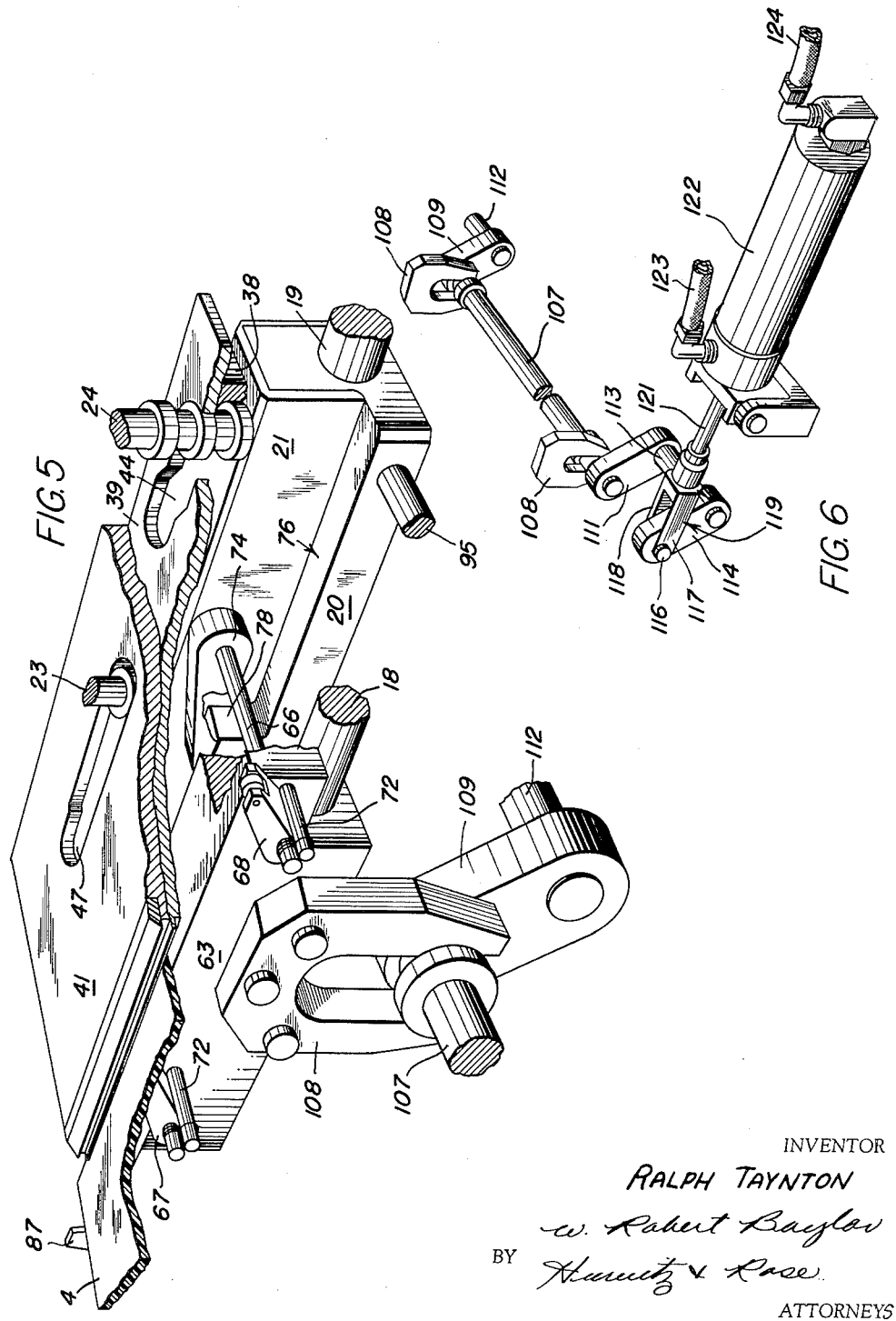

Jan. 16, 1962 R. TAYNTON 3,016,540
WAFER FEED AND POSITIONING MECHANISM FOR STAPLING MACHINE
Filed June 26, 1959 12 Sheets-Sheet 6

INVENTOR
RALPH TAYNTON
BY W. Robert Baylor
Hurwitz & Rose
ATTORNEYS

Jan. 16, 1962  R. TAYNTON  3,016,540
WAFER FEED AND POSITIONING MECHANISM FOR STAPLING MACHINE
Filed June 26, 1959  12 Sheets-Sheet 7

INVENTOR
RALPH TAYNTON
BY W. Robert Baylor
Hurwitz & Rose
ATTORNEYS

Jan. 16, 1962 R. TAYNTON 3,016,540
WAFER FEED AND POSITIONING MECHANISM FOR STAPLING MACHINE
Filed June 26, 1959 12 Sheets-Sheet 8

INVENTOR
RALPH TAYNTON
BY W. Robert Baylor
Hurwitz & Rose
ATTORNEYS

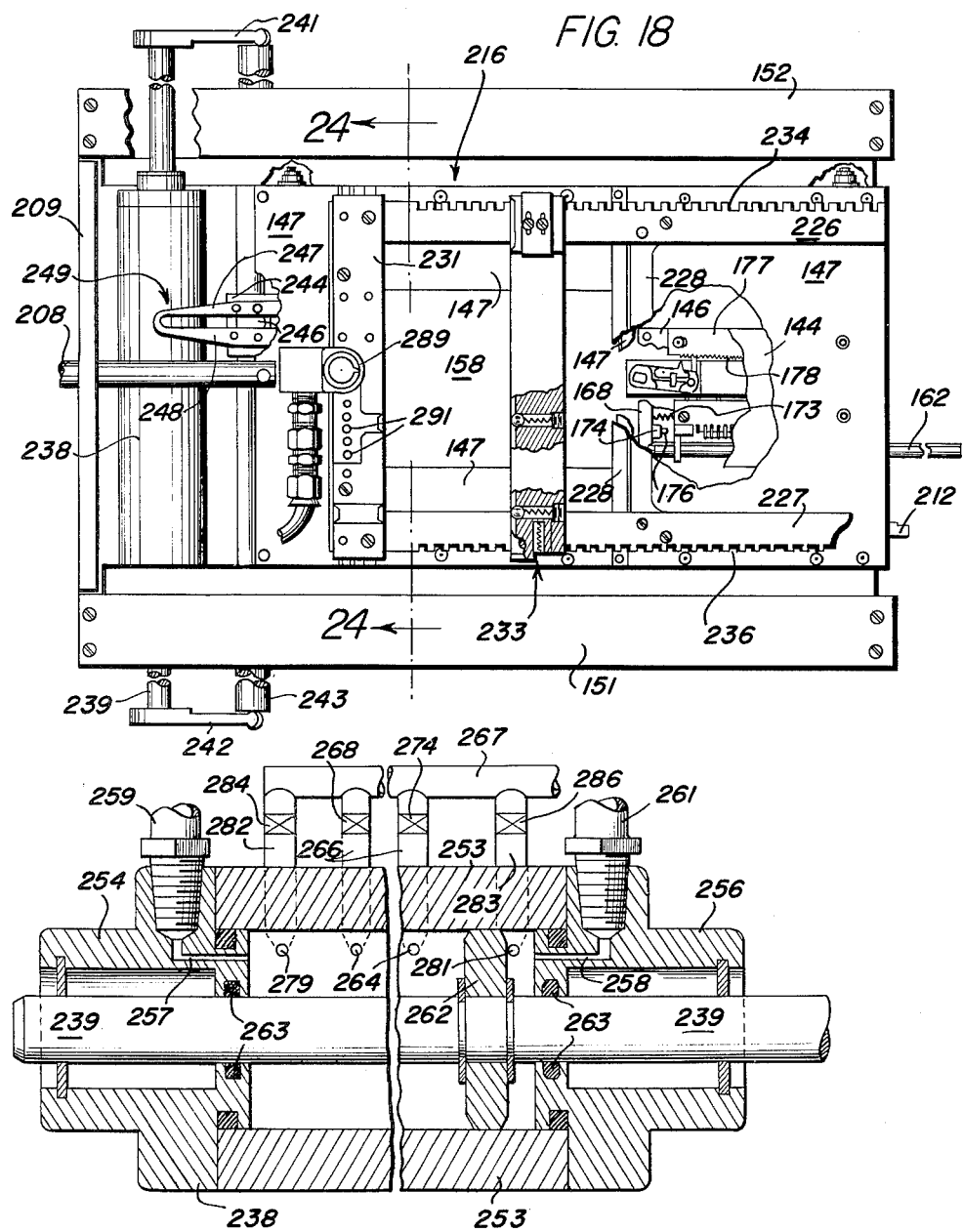

Jan. 16, 1962 R. TAYNTON 3,016,540
WAFER FEED AND POSITIONING MECHANISM FOR STAPLING MACHINE
Filed June 26, 1959 12 Sheets-Sheet 10
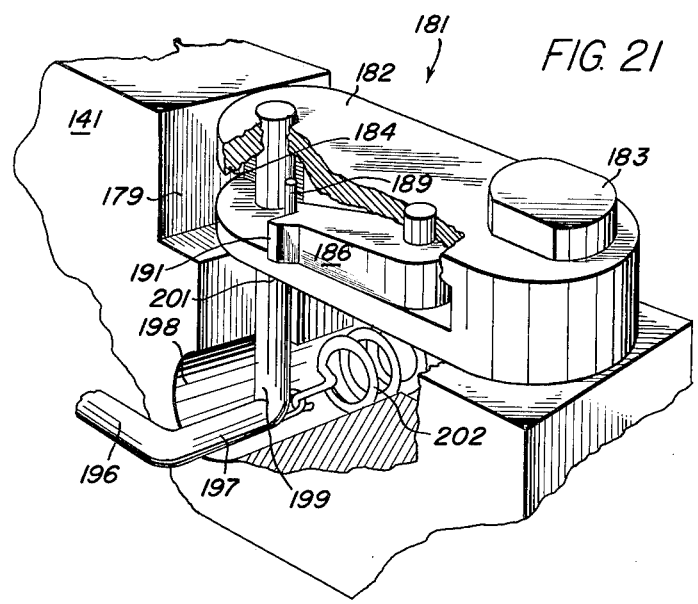
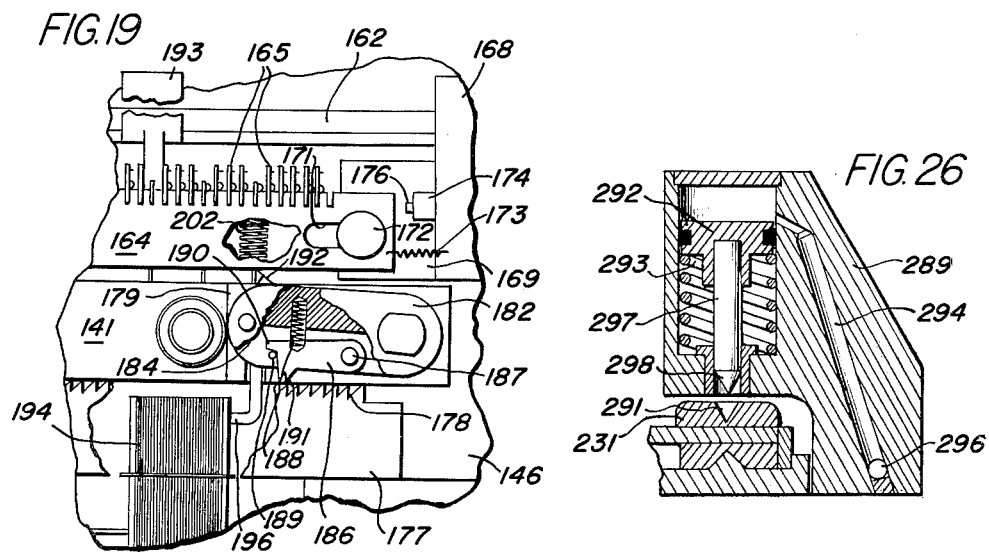
INVENTOR
RALPH TAYNTON
W. Robert Baylar
BY Hurwitz & Rose
ATTORNEYS Jan. 16, 1962  R. TAYNTON  3,016,540
WAFER FEED AND POSITIONING MECHANISM FOR STAPLING MACHINE
Filed June 26, 1959  12 Sheets-Sheet 11
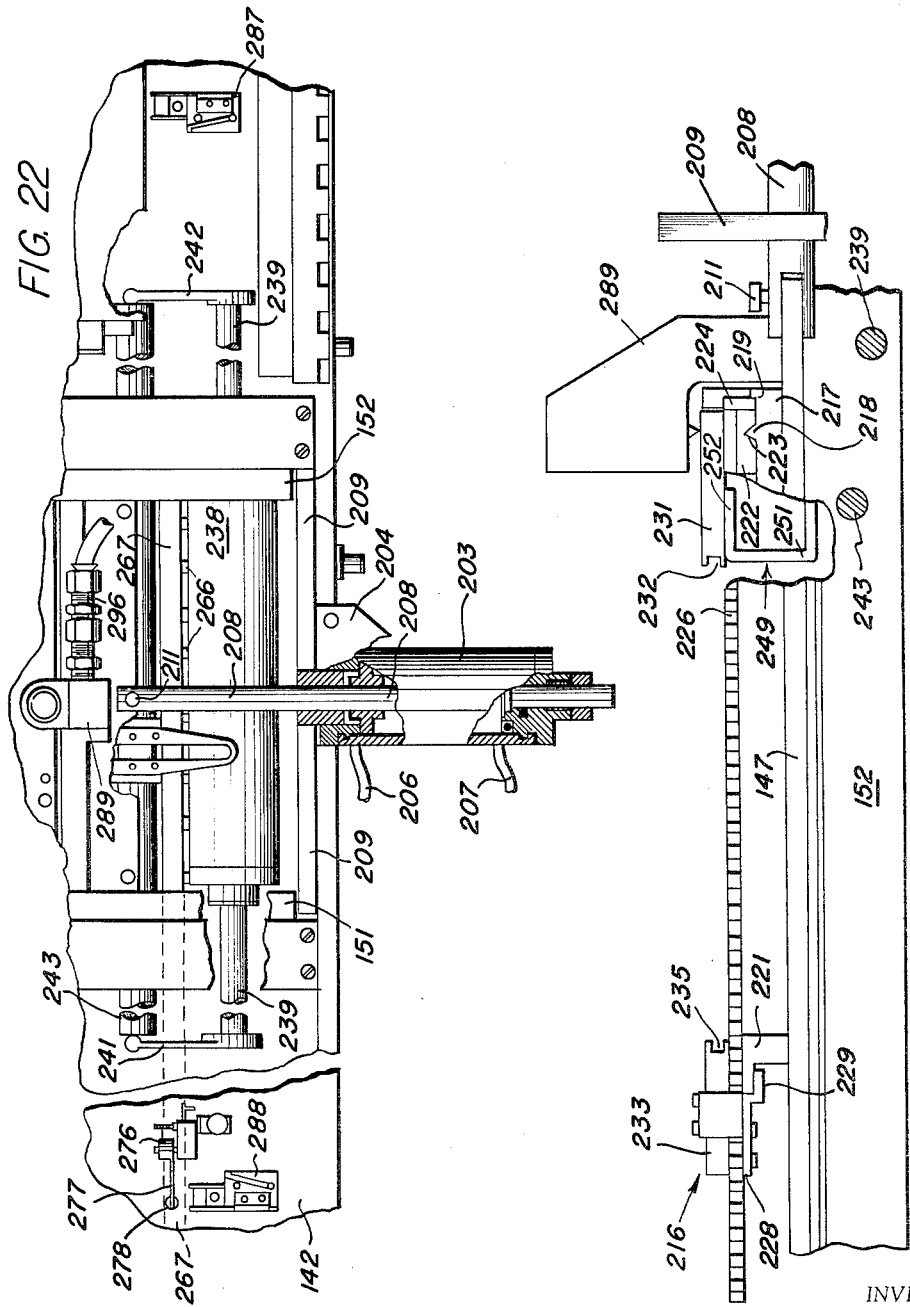
INVENTOR
RALPH TAYNTON
W. Robert Baylor
BY Hurwitz & Rose
ATTORNEYS Jan. 16, 1962 R. TAYNTON 3,016,540
WAFER FEED AND POSITIONING MECHANISM FOR STAPLING MACHINE
Filed June 26, 1959 12 Sheets-Sheet 12

FIG. 27

INVENTOR
RALPH TAYNTON
BY W. Robert Baylor
Hurwitz & Rose
ATTORNEYS

United States Patent Office 3,016,540
Patented Jan. 16, 1962

---

3,016,540
WAFER FEED AND POSITIONING MECHANISM FOR STAPLING MACHINE
Ralph Taynton, Fairfax, Va., assignor to Melpar, Inc., Falls Church, Va., a corporation of New York
Filed June 26, 1959, Ser. No. 823,102
24 Claims. (Cl. 1—321)

This application is related in subject matter to applications for United States patent, as follows:

Lawson et al., Serial No. 413,092, filed March 1, 1954, for Stapling Machines, now issued as Patent No. 2,904,-785 and dated Sept. 22, 1959.

Lawson et al., Serial No. 413,072, filed March 1, 1954, for Modular Circuitry, which has subsequently been abandoned.

Vossen et al., Serial No. 493,392, filed March 10, 1955, for Stapling Machines, now issued as Patent No. 2,904,-786 and dated Sept. 22, 1959.

Vossen et al., Serial No. 473,251, filed December 6, 1954, for Automatic Machinery, now issued as Patent No. 2,868,413 and dated January 13, 1959.

Hazel, Serial No. 513,782, filed June 7, 1955, for Stapling Machines, now issued as Patent No. 2,778,691 and dated January 22, 1957.

Vossen, Serial No. 577,328, filed April 10, 1956, for Wafer Feed and Insertion Machines, now issued as Patent No. 3,001,198 and dated September 26, 1961.

Vossen, Serial No. 627,036, filed December 7, 1956, for Card Reader.

Taynton, Serial No. 792,385, filed February 10, 1959, for Stapling Device, now issued as Patent No. 2,987,729 and dated June 13, 1961.

The present invention relates generally to automatic machines for fabricating electronic subassemblies and, more particularly, to automatic or semi-automatic machines for assembling electrical components, such as resistors, selected automatically from a large number of available types, at preselected positions on a wafer and soldering the component to printed circuitry previously placed on the wafer. Still more particularly, the present invention relates to a wafer handling mechanism including a wafer feeding mechanism for selectively supplying wafers to a work table and to a work table positioning mechanism for selectively presenting predetermined component receiving locations on the wafers to a component stapling head or other operating mechanism.

The problem of automatic assembly or fabrication of electrical or electronic subassemblies is receiving considerable attention and various approaches have been attempted. In accordance with the aforesaid patent applications and as an example of a system to which the apparatus of the present invention may be applied, a wafer, in the form of a thin sheet of insulating material, is provided with a plurality of aperture pairs, for insertion of the terminal leads of standard electric components therein. The aperture pairs are located in predetermined locations for all wafers employed in the system and a predetermined number of component positions are thus rendered available. A wafer positioning mechanism, in the form of a pneumatic servo system, is available for selectively positioning the wafers, so that any desired pair of apertures may be positioned under a stapling head, for insertion of a component. It is to be understood that although the wafer feeding and positioning mechanism of the present invention is described with specific reference to a component insertion and stapling apparatus, the mechanism may be employed with single or dual wafer drilling or punching devices, eyelet insertion devices or combinations thereof and additions thereto.

Continuing with a description of the system to which the wafer feeding and positioning mechanism of the present invention is particularly applicable, each wafer is provided with pretinned printed circuitry on one or both of its sides and the components are secured to either side. The wire terminals of the components passing through apertures which intersect the printed circuits and are bent into stapled relation to the wafer and into intimate contact with the printed circuitry on the opposite side from which the component was inserted. During the stapling process, the wire terminals are heated sufficiently to form a solder joint with the printed circuitry. My pretinning the printed circuitry, just the correct thickness of solder may be made available and no problems with solder application arise in the operation of the machine.

In order to provide preselected components to the assembly or stapling position, components of identical type are stacked in separate gravity feed hoppers, adjacent a pneumatic conveyor. The separate components may be delivered to the conveyor by electro-magnetically actuated hopper gates, each of which is associated with one hopper and designed to drop one component when briefly energized. The problem of providing selected components to the conveyor in order becomes, then, one of selectively energizing the hopper gates.

The component conveyor itself comprises an elongated channel generally of V-cross section having air nozzles distributed along the base of the V. The air nozzles are all directed so as to impel components which fall into the channel towards an egress point at which is located a wafer holder and positioning device and a stapling head.

Each component, as it is dropped into the channel is rapidly blown to the stapling position where it is stapled to a wafer previously positioned. After a stapling operation is completed, a new component is dropped and a wafer can be positioned to accept same. The described construction permits use of a large variety of components because the component hoppers may be of relatively slight width and the conveyor may be of any desired length. Moreover, the conveyor may be of considerable width and the hoppers relatively thin so that the hoppers may be distributed both lengthwise and widthwise on the conveyor if desired.

The moving components of the machine are operated by pneumatic servos, electrically controlled. In particular, the wafers are positioned in two co-ordinate directions by a pair of servos acting at right angles relative to one another. This enables complete positioning in two co-ordinate directions on a quantized basis so that any preselected pair of lead receiving apertures may be placed in component insertion position by selecting one servo control electro-magnet with each position in one co-ordinate direction and by appropriately controlling a further servo motor system to establish a position in a second co-ordinate direction. Once a selected component has been made available to the stapling position and a wafer has been appropriately positioned, a stapling and soldering head is actuated pneumatically. The stapling head removes the component from stapling position, bends the wire leads of the component at right angles to the component, carries the component down to the wafer and inserts the bent lead through the apertures in the wafer. The anvil of the stapling and soldering head moves up under the wafer, forms the staple by further bending the wire ends into proximity to and parallelism with the under side of the wafer and simultaneously heats the wire ends and the pretinning on the printed circuitry, sufficiently to effect soldering. In an improvement of the device just described and disclosed and claimed in the aforesaid Taynton application, Serial No. 792,385, after the leads of the component have been inserted through the apertures in the wafer and prior to the stapling platform contacting the leads, the leads are prebent so as to insure proper bending of the leads when the leads are contacted by the stapling platform. Apart from the improvement of the aforesaid copending Taynton application, the apparatus referred to is described in detail in the Vossen application, Serial No. 577,328 with amplification of parts thereof found in others of the aforesaid applications.

The selection of components and wafer positions in the system above described may be controlled either in response to selectively actuatable push-button switches or by means of punched cards or equivalents thereof, with each card containing sufficient control information to complete assembling of one or more sets of components on one or more wafers. The cards contain, accordingly, co-ordinated information concerning wafer position and of component type corresponding to each wafer position. A given card contains control information for one or more complete subassemblies, and cards may be punched for any combination of component types and wafer locations which are within the capability of the machine as well as for the order of assembly of the components on the wafer. The punch card reading mechanism required to control the machine in accordance with information contained on punch cards is disclosed in the co-pending Vossen application, Serial No. 627,036.

In accordance with the present invention, use may be made of all of the apparatus of the aforesaid co-pending applications except that relating to wafer feeding and wafer positioning under the stapling or other operating head. In the aforesaid applications, the wafer feeding and positioning mechanism is capable of handling wafers of only one specific size and could position these wafers in only seven distinct positions in one co-ordinate direction and two distinct positions in the other co-ordinate. Actually, the mechanism for positioning the wafer in the seven distinct positions can be readily modified to provide additional positions but the mechanism was limited to two positions in the other co-ordinate direction. In accordance with the present invention, the wafer feeding and positioning mechanism may accommodate wafers of two or more and, for example, three distinct sizes, related as one, two and three, along one of its co-ordinate dimensions and a large number of sizes varying by discrete predetermined increments along its other co-ordinate dimension. Further, the wafer positioning mechanism may position the wafers in one co-ordinate direction in seven distinct positions in accordance with the embodiment disclosed and in a large number of positions in the other co-ordinate direction which are spaced from one another by predetermined increments of a relatively small size.

The wafer feeding and positioning mechanism of the present invention provides a great deal more flexibility in both the size of wafer which may be accommodated and in the positions which the wafer may be caused to assume under the operating head whether it be a stapling head, a drilling head, a riveting head or other suitable operating mechanisms.

As in the aforesaid applications, while the wafer positions and components may be selected either manually or in response to recorded data, as for example, punch cards, the cycling of the present system is controlled, as to each event in the cycle, by the completion of the preceding event, and interlock circuits are provided to prevent incorrect cycling, or incorrectly timed cycling.

It is, accordingly, a broad object of the present invention to provide a novel automatic machine for fabricating electronic or electrical subassemblies.

It is a further object of the present invention to provide mechanism for feeding wafers and electrical components in ordered relation to an assembly position.

It is another object of the present invention to provide a system of punched-card controlled electrical subassembly fabrication.

A further object of the present invention resides in the provision of a system of automatic electrical subassembly in which electrical components are assembled on wafers, and in which selection of plural components and of positions of the wafer to which the components will be secured is controlled automatically in response to control data on a record.

It is still a further object of the present invention to provide a system of positioning wafers by electrically controlled pneumatic motors in a plurality of distinct positions relative to two co-ordinate directions.

A further object of my invention resides in the provision of a novel wafer feed mechanism which provides for abstracting wafers one at a time from a wafer magazine and feeding the wafers accurately to the wafer positioning mechanism.

It is yet another object of the present invention to provide a wafer feed mechanism and a wafer positioning mechanism in which the feeding of a wafer from the former to the latter is effective to remove a wafer from the positioning mechanism.

The above and still further objects, features and advantages of the present invention will become apparent upon consideration of the following detailed description of one specific embodiment thereof, especially when taken in conjunction with the accompanying drawings, wherein:

FIGURE 2 is an enlarged perspective view illustrating primarily the wafer feeding and positioning mechanism of the present invention;

FIGURE 3 is an enlarged perspective view of the wafer feeding mechanism of the present invention;

FIGURE 4 is an unassembled view of one of the operating mechanisms of the feeding mechanism of the present invention;

FIGURE 5 is an enlarged perspective view of one of the feed actuating mechanisms of the feed mechanism of the present invention;

FIGURE 6 is a perspective view of the driving apparatus for the feeding mechanism of the present invention;

FIGURE 10 is a top view taken during one part of the cycle of operation of a group of camming plates which control dropping of the individual wafers;

FIGURE 11 is a cross sectional view in elevation taken along line 11—11 of FIGURE 10;

FIGURE 12 is a top view of the camming plates during another part of the cycle of operation of the wafer dropping mechanism;

FIGURE 13 is a cross-sectional view in elevation taken along line 13—13 of FIGURE 12;

FIGURE 14 is a top view of the camming plates illustrating another of the members during another part of the feeding cycle;

FIGURE 15 is a view taken along line 15—15 of FIGURE 14;

FIGURE 18 is a top view of the wafer positioning mechanism of the present invention;

FIGURES 19 and 20 are detailed top views of the mechanism for controlling movement of the wafer positioning table in one co-ordinate direction;

FIGURE 21 is a perspective view of a detenting mechanism for controlling movement of the table in one co-ordinate direction;

FIGURE 22 is a top view partially in cross section of servo motors employed to move the wafer positioning table in two co-ordinate directions;

FIGURE 23 is a detailed view in elevation of the wafer holding mechanism which is movable in a direction toward and away from the wafer feeding mechanism;

FIGURE 25 is a schematic diagram employed to illustrate the operation of the pneumatic servo motor for controlling movement of the wafer positioning mechanism toward and away from the wafer feeding mechanism;

FIGURE 26 is a cross sectional view in elevation of an apparatus for detenting the table in each of a plurality of predetermined positions along a direction of movement toward and away from the feeding mechanism; and FIGURE 27 is a schematic wiring diagram of the control mechanism for the wafer feeding and positioning mechanisms of the present invention and of its connection to an external card reader for controlling the apparatus.

Figure 1:
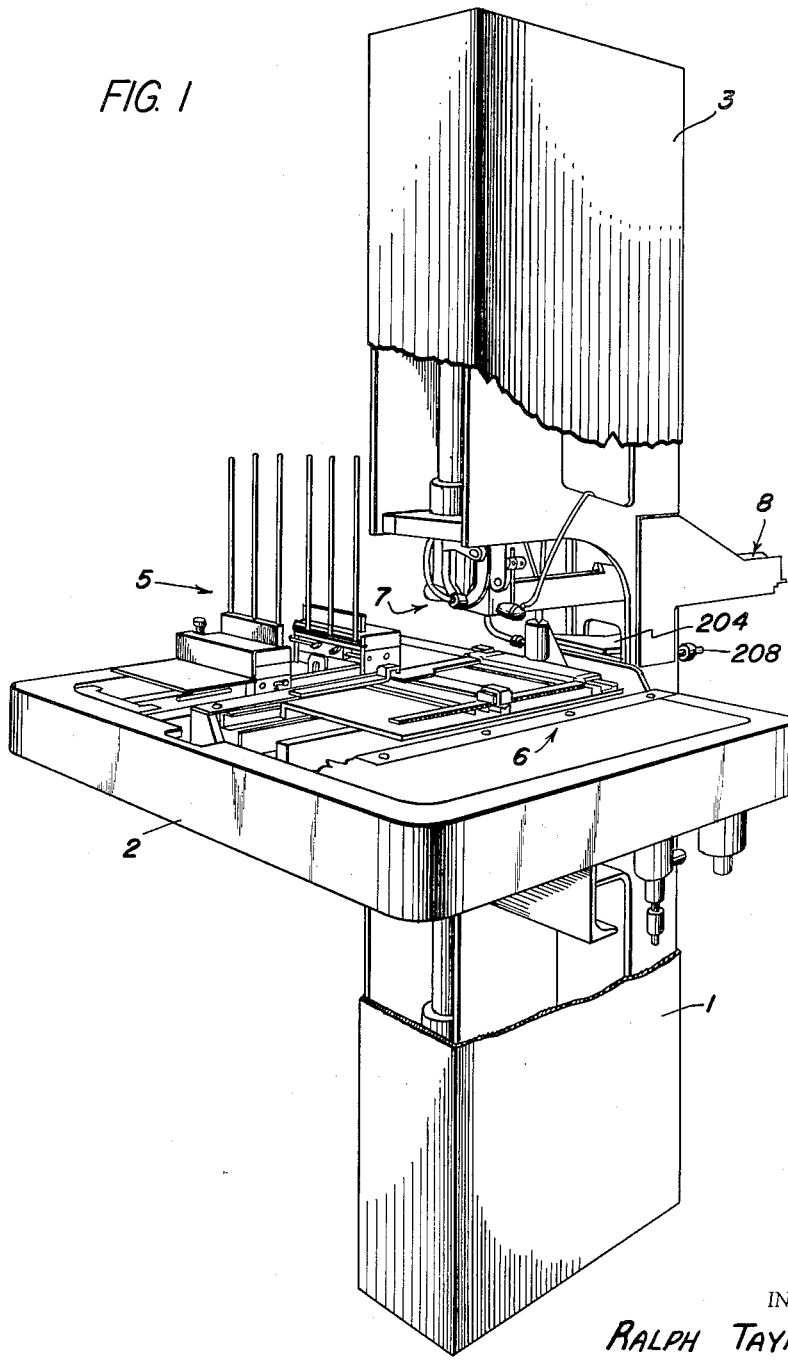
FIGURE 1 is a perspective view in elevation of a machine employing the mechanism of the present invention.
Figure 7:
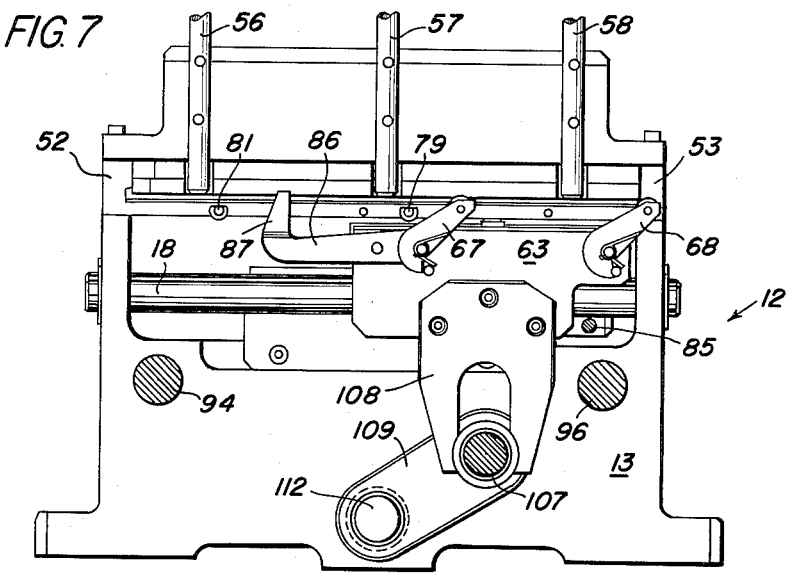
FIGURE 7 is a side view in elevation of one of the two mechanisms for holding and controlling the feed of one side of each of the wafers.
Figure 8:
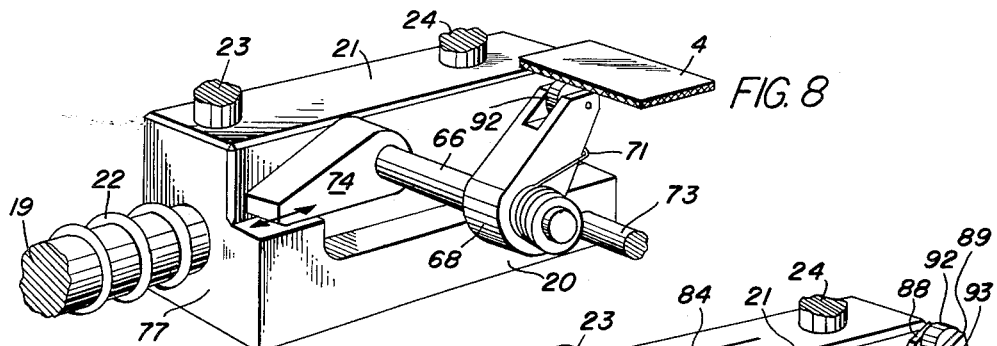
FIGURES 8 and 9 are perspective views of the mechanism for controlling the dropping of the individual wafers, illustrated at different times in the wafer drop cycle.
Figure 9:
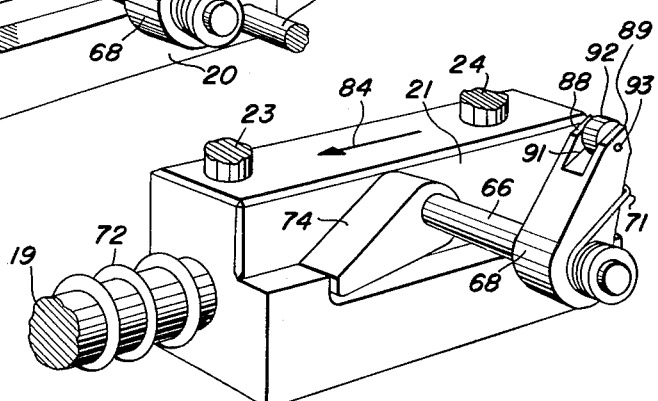

Referring specifically to FIGURES 1 and 2 of the accompanying drawings, there is illustrated a specific machine with which the wafer feeding and positioning apparatus of the present invention may be utilized. The machine comprises a base or stand 1 which supports a horizontal table 2 and a vertical head portion 3 disposed above the table 2. The head member 3 may carry any desired working member for operation upon wafers 4 fed from a wafer feeding mechanism 5 to a wafer positioning mechanism 6. In the aforesaid co-pending patent applications, the apparatus contained within the head 3 comprises a stapling mechanism for applying standard size components such as resistors and capacitors to the wafers and stapling and soldering the components thereto. In the machine of the aforesaid applications, a hydraulic ram is situated in the head portion 3 and is employed to drive the stapling mechanism vertically downward so as to permit it to perform its predetermined functions. Components to be applied to the stapling mechanism are fed, in the aforesaid applications, via a pneumatic conveyor generally designated by the reference numeral 8 to the head mechanism 7 in response to commands received by the aforesaid card reader.

Referring now specifically to FIGURES 2 through 9 for a description of the wafer feeding mechanism, the mechanism comprises two spaced mechanisms 11 and 12, which are mirror images of one another except for minor details to be discussed subsequently. For purposes of brevity, only the member 12 is described in detail. The member 12 comprises a main solid block 13 of generally rectangular vertical and horizontal cross sections and having a greater vertical height than width. The top of the block 13 is provided with a rectangular recess 14 which is open on the side facing the block 11. A wall 15 defines the long side of the recess 14 and walls 16 and 17 define the narrow ends of the recess 14 and extend outwardly from the main body of the block 13 toward the mechanism 11 for a short distance. Two parallel shafts 18 and 19 are supported between the end walls 17 and 16 of the recess 14 with the shaft 19 being disposed above the main block 13 and the shaft 18 being disposed between the portions of the walls 16 and 17 which extend outwardly from the main body. Disposed within the recess 14 and slidably positioned on the shaft 19 is an L-shaped slide 21 having a foot 20 extending toward the apparatus 11. The slide 21 is biased towards the end wall 17 by a helical spring 22 disposed about the shaft 19 and abutting the end wall 16 and one end of the slide 21.

The slide 21 has two upstanding shafts 23 and 24 extending vertically upward from the top surface of the slide 21 which shafts are aligned with respect to one another along an axis parallel to the shafts 18 and 19. The shafts 23 and 24 are enlarged at their bottom ends to provide enlarged portions 26 and 27 and the shaft 23 carries three rollers 28, 29 and 31 in predetermined spaced relation above the enlarged portion 26. A retainer ring 32 is disposed above the stack of rollers 28, 29 and 31 to prevent removal of the rollers from the shaft 23. Similarly, the shaft 24 is provided with rollers 33, 34 and 36 having the same vertical spacing therebetween as the rollers 28, 29 and 31 and is also provided with a retainer ring 37. Disposed above the block 13 and supported on the top of the rear wall 15 is a wafer support plate 38 and disposed immediately above the support plate 38 are two cam follower plates 39 and 41 with the latter disposed above the former. The plate 38 has two elongated slots 42 and 43 having disposed therein the enlarged portions 26 and 27 of the shafts 23 and 24 respectively. The cam follower plate 39 has two shaped slots 44 and 46 adapted to receive the rollers 28 and 33 of the shafts 23 and 24 respectively. The slots 44 and 46 are not straight but have predetermined configurations which provide a camming surface for the plate 39. The plate 41 also has shaped slots 47 and 48 which provide cam follower surfaces for the plate 41. The rollers 31 and 36 of the shaft 23 and 24 are disposed in the slots 47 and 48 respectively. A stationary plate 49 is disposed immediately above the cam follower plate 41 and has a pair of elongated slots 51, only a portion of one of which is illustrated, for receiving the uppermost rollers 31 and 36 of the posts or shafts 23 and 24. The plate 49 is stationary and provides an upper support for the shafts.

The plate 38 is provided with two end walls 52 and 53 which extend upwardly above the end walls 16 and 17 respectively of the block 13 and are suitably bolted thereto. The plates 39 and 41 are disposed between the walls 52 and 53 and rest on the surface of plate 38. The plate 49 rests on top of the stack of the three plates and overlays the end walls 52 and 53 to which it is bolted. The plate 49 has an upstanding wall 54 facing the apparatus 11 and has secured thereto three vertical and generally circular rods 56, 57 and 58. The rods 56, 57 and 58 extend upwardly from the wall 54 and are adapted to engage grooves suitably formed in the wafers 4 for aligning the wafers on the rods 56, 57 and 58 and with respect to the feeding mechanism. The rods also extend downwardly from the wall 54 through grooves, all generally designated by the reference numeral 59, formed in the surfaces of the plates 39 and 41 facing the apparatus 11. The plate 41 is provided with a horizontal recess 61 along its entire surface facing the apparatus 11 so as to receive a rubber strip 62 which is retained in the groove 61 by a metallic strip 65 secured to the plate 41 and overlying the rubber strip 62.

The plates 38 and 49 are stationary with respect to the block 13, while the plates 39 and 41 are retrained as to movement along a path parallel to the shafts 18 and 19 but are permitted to move perpendicular to the shafts 18 and 19 in order to provide for feed of the wafers stacked within the apparatus. More particularly, upon movement of the block 21 along the shaft 19 towards the end wall 16, the rollers 26 and 28 of the shaft 23, and rollers 33 and 34 of the shaft 24 engage various portions of the slots in the plates 39 and 41 and cause these plates to shift inwardly and outwardly with respect to the rear wall 15 of the block 13. A pair of springs 65' are employed to bias the plate 41 toward the stack of wafers. During the feeding operation the stack of wafers is suspended between the plates 41 and the force of the springs 65' are required to provide adequate support.

In order to produce movement of the slide 21, there is provided a second slide 63 which is mounted on the shaft 18 for sliding movement with respect thereto. The block 63 is suitably apertured to rotatably receive cross shafts 64 and 66 each of which has secured thereto fingers 67 and 68. The fingers 67 and 68 are urged to rotate counterclockwise, as viewed in all the figures of the drawing, by springs 69 and 71 respectively and their counterclockwise movement is limited by stops 72 and 73 respectively to which one end of the springs 69 and 71 are attached. The fingers 67 and 68 are mounted on the side of the slide 63 adjacent the apparatus 11 and the shaft 66 carries a shoe 74 on the side of the slide 63 adjacent the slide 21. The slide 63 is adapted to ride in a groove 75 in the block 13 formed in the edge thereof adjacent the shaft 18 and extending downwardly from the recess 14. As a result, the shoe 74 overlies the foot 20 of the slide 21 and is adapted to ride in a recess 76 formed in the top surface of the foot 20. The recess 76 in the shoulder 20 terminates in an end wall 78 near the end of the block 21 which is closest to the end wall 16 of the block 13. Thus, when the second slide 63 is moved from adjacent the end wall 17 of the block 13 towards the end wall 16, the shoe 74, if disposed in the recess 76, engages the surface 78 of the groove 76 and moves the slide 21 along with it towards the wall 16. Movement of the guide 21 produces movement of the plates 39 and 41 in a suitable manner, to be described subsequently, to effect dropping of one wafer onto a ledge 80 of the plate 38 which ledge is adapted to receive the wafers 4 after they have been dropped from the stack.

As will become apparent subsequently it is necessary to disengage the shoe 74 from the wall 78 when the slides 63 and 21 near the end of their strokes towards the walls 16 so as to permit the slide 21 to return toward the wall 17. In order to accomplish this action a post 79 extends outwardly from the ledge 80 of the plate 38 toward the apparatus and is positioned along the direction of movement of the slide 63 such that it is contacted by the finger 68 as the slide approaches the limit of its movement toward the wall 16. The finger 68 is rotated clockwise as a result of contact with the post 79 and the shoe 64 is rotated out of the recess 76 in the slide 21. The slide 21 is now permitted to return toward wall 17 under the force of the spring 22. A second post 81 extends outwardly from the ledge 80 and rotates the finger 67 clockwise at the end of the stroke of the slide 63 for purposes to be explained subsequently.

Continuing the description of the mechanisms associated with the second slide 63, there is provided a horizontally and rearwardly extending arm 86 secured to the shaft 64 which supports the finger 67. The arm 86 extends from the block 63 parallel to the shafts 18 and 19 and in a direction towards the end wall 16 of the block 13. The arm 86 terminates in an upwardly extending tab 87 which, as will appear subsequently, is employed as one of the members for pushing the wafer towards the table mechanism 6 of the apparatus.

The fingers 67 and 68 are substantially identical and each terminates in an end remote from its associated shaft in a yoke which defines side walls 88 and 89 and a recess 91 therebetween. A roller 92 is disposed in the recess 91 between the walls 88 and 89 and is rotatably supported there between by a pin 93. The roller extends in a vertical direction above the walls 88 and 89 but is disposed rearwardly of the forward surfaces of these walls; that is, rearwardly of the surfaces of the walls which are directed toward the end wall 17 of the block 13.

As previously indicated, the apparatus 11 and 12 are substantially identical and the only differences therebetween grow out of the fact that the apparatus 12 is stationary; that is, is secured to the bed of the table 2 while the apparatus 11 is movable along rails with respect to the apparatus 12. More particularly, a pair of rods 94 and 96 are mounted in the block 13 and are rigidly secured thereto. The rods 94 and 96 extend outwardly from the block 13 towards the apparatus 11, and through suitable apertures in the apparatus 11 to an end block 97 which is supported on the bed of the table 2 in substantially the same manner in which the block 13 is secured to the bed. Further, a shaft 95 which is secured to the forward end of the slide 21 passes through a relatively snugly fitting aperture in the corresponding slide 21 in the apparatus 11 but extends through a slot 98 (see FIGURE 2) in the block 13 of the apparatus 11 to a point in a general region of the block 97. In this way, the slides 21 are constrained to operate in complete synchronism by means of the interconnection through the shaft 95 but at the same time, adjustment of the relative positions of the members 11 and 12 is permitted. The positions of the member 11 along the shafts 94 and 96 is determined by a plurality of teeth 99 formed on the lower surfaces of the shafts 94 and 96. Each set of teeth 99, which are illustrated as square teeth, is engaged by a distinct pawl 101 only one of which is illustrated in FIGURE 3. The pawl 101 is carried at the lower end of the rod 102 which extends through a flange 103 of the block 13 of the apparatus 11. The shaft 102 is biased upwardly by a spring 105 and the upper end of the shaft is engaged by an arm 104. The arm 104 is secured to the end of the shaft 18 of the apparatus 11 adjacent the wall 17 of the block 13 and may be rotated by rotation of the shaft. By rotating the arm 104 counterclockwise, as illustrated in FIGURE 3, the shaft 102 is depressed so that the pawl 101 is disengaged from the teeth 99 of the shaft 96. A corresponding arm 104 is disposed on the shaft 18 at the other end of the block 13 of the apparatus 11 and a plunger 106 extends upwardly therefrom. Disposed under the arm 104 is a shaft 102 and a pawl 101 so that by depressing the plunger 106 the shaft 18 is rotated and removes both pawls 101 from engagement with the teeth 99 of the shafts 94 and 96. When the plunger 106 has been depressed, the apparatus 11 may be moved to any position along the shafts 94 and 96 so as to accommodate various widths of wafers 4 within the limits of movement of the apparatus 11. The teeth 99 are approximately one-tenth of an inch on center and therefore the apparatus may accommodate wafers which vary in size by one-tenth of an inch.

In order to operate the wafer feeding apparatus, there is provided a shaft 107 which is coupled to the second slides 63 by means of an inverted U-shaped member 108, the arms of the U-shaped member 108 being disposed on opposite sides of the shaft 107. The shaft 107 is supported between links 109 and 111 (see FIGURE 6) and the link 109 is pivotally supported on a stub shaft 112 which is mounted in the block 13 of the apparatus 12. The shaft 107 passes under the apparatus 11 through an arcuate recess formed in the bottom of the block 13 (see FIGURE 2) and the link 111 is disposed adjacent the block 97 where it is secured to a shaft 113 which is rotatably supported in and passes completely through the block 97. Secured to the end of the shaft 113 remote from the link 111 is a further link 114, the upper end of which as viewed in FIGURES 3 and 6 supports a shaft 116. The shaft 116 passes through a suitable aperture in the link 114 and in arms 117 and 118 of a yoke 119 with the arms 117 and 118 being disposed on opposite sides of the link 114. The yoke 119 is supported on the end of a piston rod 121 which is secured to the piston (not illustrated) of a hydraulic or pneumatic motor 122. The motor 102 receives fluid under pressure through inlet hoses 123 and 124 and when fluid is applied to the hose 123, the piston rod 121 is retracted so that it produces rotation of the link 114 clockwise about the center or axis of the shaft 113. When fluid is applied to the hose 124, the piston rod 121 and the link 114 rotate counterclockwise about the axis of the shaft 113.

In the operation of the wafer feed mechanism and reference is now made to FIGURES 10 through 15, initially the slide 21 is adjacent the wall 17, hereinafter referred to as the forward position, and the slide 63 is adjacent the wall 16, hereinafter referred to as the rearward position. In consequence, the cam follower plates 39 and 41 and the shafts 23 and 24 are in positions illustrated in FIGURES 10 and 11. At this time the stack of wafers 4 is held between the rubber strips 62. Pressurized fluid may now be applied to the hose 123 so as to retract the piston shaft 121 and rotate the link 114 clockwise and move the slides 63 to their forward positions. In this position, the shoe 74 becomes seated in the groove 76 in the shoulder 20 of the slide 21 so that when the pressurized fluid is now applied to the hose 124 and the slide 63 is moved rearwardly, the shoe 74 engages the surface 78 of the slide 21 and begins to move rearwardly. Initially, during the rearward movement of the cam slide 21 the cam followers enter portions 126 and 127 of the slots 44 and 46 in the plate 39 and retract it. However, none of the wafers 4 are resting on the plate 39, the stack being supported between the rubber strips 62 and therefore a wafer cannot fall onto the ledge 60. Upon continued movement of the guide 21 the cams leave the portions 126 and 127 of the slots in the plate 39 and the plate is returned to its leftmost position, as illustrated in FIGURE 15. However, during the latter portion of rearward movement of the slide 21, the cams enter portions 128 and 129 of the slots 47 and 48 in the plate 41 and retract the plate 41 as illustrated in FIGURES 14 and 15. In consequence, the stack of wafers 4 is released and drops onto the upper edge of the plate 39. When the slide 21 reaches its rearwardmost position along with the slide 63, the fingers 67 and 68 are depressed by the rods 81 and 79 respectively and the shoe 74 is removed from the groove 76 of the cam slide 21 thereby releasing the slide 21 and permitting it to be returned to its forward position by the action of the spring 22.

Upon forward movent of the slide 21, the cam rollers leave the portions 128 and 129 of the slots in the cam plate 41 so that the plates move inwardly and engage opposite edges of the wafer 4 immediately above the wafer resting on the plate 39. The spacing between the rubber strips 62 and the upper surface of the plate 39 is equal to the thickness of one wafer so that the wafer immediately above the wafer on the plate 39 is supported between the rubber strips 62 and cannot fall when the plate 39 is retracted. Upon the cams again entering the portion 126 and 127 of the slots of the plate 39 and the plate 39 is retracted and the wafer lying on the plate is dropped onto the ledge 60 of the plate 38. Upon the slide 21 reaching its forwardmost position, the plate 39 is again extended and overlies the wafer which has been dropped onto the shoulders 60.

The plate 39 prevents upward movement of the wafer lying on the surface 60, when the guide 63 is again moved forward to effect a feed operation since upon forward movement of the slide 63, the fingers 67 and 68 are removed from a region of the studs 79 and 81 and would force the wafer upwardly against the bottom of the stack. The plate 39 prevents this action and allows the wafer 4 lying on the ledge 60 to rise only a small predetermined distance since the plate 39 holds down the wafer on the ledge 60 during all intervals except when the slide 63 is forward of its rearwardmost position and the ends of the fingers 67 and 68 are free to rise.

Figure 16:
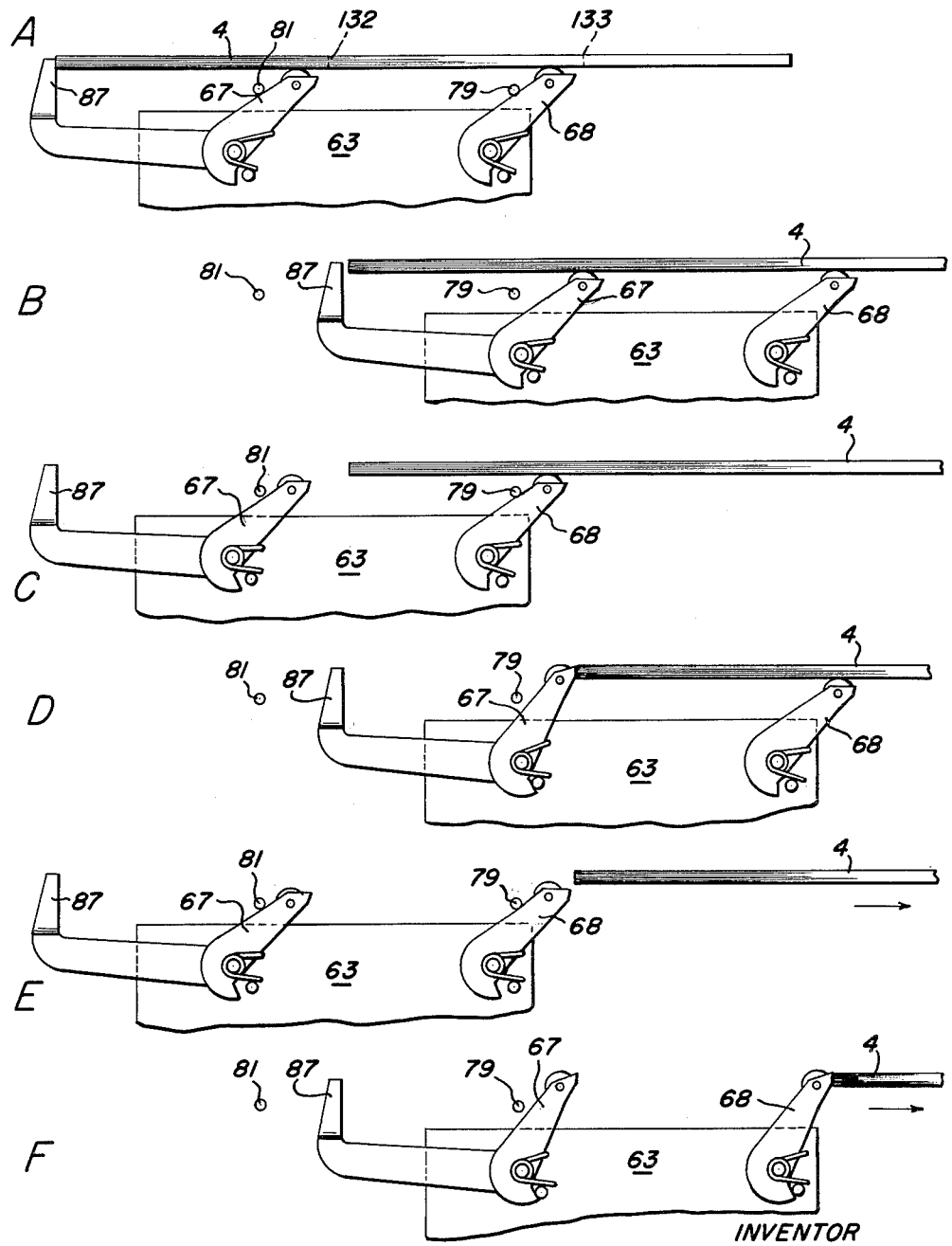
FIGURE 16 is a schematic view illustrating the positions of the wafer pushing and supporting elements during various parts of successive feed operations.
Figure 24:
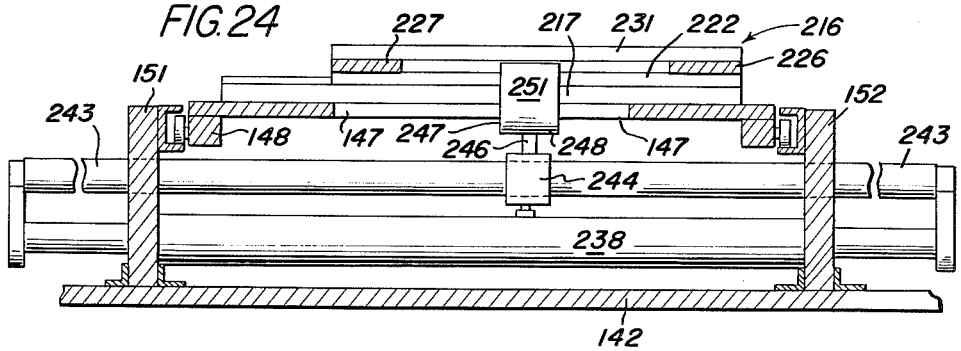
FIGURE 24 is a cross sectional vertical diagram taken along line 24—24 of FIGURE 18.

Any time that a wafer is disposed on the ledges or shoulders 60 the arms 67 and 68 are retained in their downwardmost positions. Thus, only when a wafer is not on the shoulder 60 may the arms 68 rise sufficiently to cause the shoe 74 to be depressed into the groove 76 in the slide 21 and thereby produce a feed of the wafer. More specifically, and reference is now made to FIGURE 16 of the accompanying drawings, a wafer 4 is initially dropped when the guide 63 is completely retracted and falls on top of the depressed arms 67 and 68 and immediately forward of the upwardly extending tab 87 of the arm 86. The wafer 4 in position A of FIGURE 16 is a wafer of the maximum width acceptable by the apparatus of the invention and is illustrated in a position immediately after it has been dropped. The operation described above relates only to dropping a wafer from the stack and does not relate to feed of the wafer to the table 6. When it is desired to feed the wafer to the table 6 for subsequent positioning under the head 7 pressurized fluid is fed to the hose 123 so that the slides 63 are moved forward. The slides 63 move forward a sufficient distance to carry the left edge, as illustrated in FIGURE 16, of the wafer 4 just forward (see Position B of FIGURE 16) of the position of the finger 67 when it is in its rearward position as illustrated in Position A. It will be noted that during the interval of forward movement of the slide 63 the finger 68 underlies or is disposed under a wafer 4 at all times and cannot rise so as to permit the shoe 74 to enter the groove 76. Therefore, when the slides 63 are returned to their rearward positions, upon application of pressurized fluid to the hose 124, the slide 21 is not retracted. However, upon the slide 63 reaching its rearwardmost position (Position C), the finger 67 comes out from under the wafer 4 but the finger 68 remains thereunder.

The cycle operation of the apparatus of the invention is such that upon the slide 63 reaching its rearward position, the table 6 removes the wafer 4 just fed thereto, from the vicinity of the feed mechanism. The table 6 at this time has two wafers thereon. The last one-third section of the first wafer presented to the tube 6 is now operated upon by the stapling mechanism; the first one-third section of the wafer still being out of the region presented to the stapler during this cycle of operation. Upon completion of the stapling cycle, the table 6 returns the wafer to the position illustrated in Position C of FIGURE 16; that is, its position immediately after the first feed operation. Upon the next cycle of movement of the feeding mechanism; that is, forward movement of the slide 63, the wafer 4 is pushed forward by the fingers 67, a distance equal to the spacing between the fingers 67 and 68 and ejects the old wafer from the table 6. The finger 68 moves forward with the mechanism (see Position D) and therefore remains under a wafer 4 so that the finger cannot rise and the shoe 74 cannot be depressed into the groove 76 in the slide 21. Consequently, when the slides 63 return to their rearward positions, the slide 21 remains stationary.

When the slide 63 has again obtained its rearward position (Position E), the finger 68 is now out from under the wafer 4 so that upon the next cycle of forward movement of the slide 63, the finger 68 is disposed behind the wafer 4, Position E, FIGURE 16. Prior to the next feed cycle, however, the table 6 again removes the wafer from the vicinity of the wafer feed mechanism 5 and presents various component receiving locations of the first one-third section of the wafer to the head. At the end of this part of the cycle, the table 6 returns the wafer 4 to its Position E illustrated in FIGURE 16. Upon forward movement of the slides 63, the fingers 68 push the wafer 4 to Position F, FIGURE 16 and the wafer 4 has now been inserted its maximum distance onto the table 6. Since the finger 68 is not under the wafer 4 but is behind it, the finger 68 rises a sufficient distance to permit the shoe 74 to enter the recess 76 in the slide 21 so that upon subsequent rearward movement of the slide 63, the cam slide 21 is moved rearwardly and feeds another wafer to Position A. The table 6 again removes the wafer 4 from the vicinity of the wafer feed mechanism 5 and presents component locations disposed in the middle one-third section of the wafer to the head 7. After components have been inserted where required, the table 6 returns the wafer to its position as illustrated in Position F, FIGURE 16. Upon the next cycle of forward movement of the slide 63, Position B, the wafer 4 in the loading mechanism 5 pushes the last one-third of the wafer already on the table 6 into the region of operation of the head and the feed cycle is completed.

It can be seen from the above that the only time the slides 21 move rearwardly is when a new wafer is dropped on the ledge 60 of the plate 39 and advantage is taken of this fact to count the number of wafers which are fed by the apparatus. More particularly, and reference is now made to FIGURE 2 of the accompanying drawings, a limit switch 131 is disposed on one side of the block 11 in the path of movement of the shaft 95. More specifically, the operating lever of the limit switch 131 is disposed at the end of the slot 98 so that when the shaft 95 has been retracted to its maximum extent, it closes the switch 131 thereby closing the circuit of an electromagnetically actuated counter (not illustrated).

From the above, it is apparent that wafers of three different sizes in the direction of feed of the wafers may be utilized with the apparatus of the invention. The wafer illustrated in FIGURE 16 is of maximum size but a wafer of two-thirds or one-third of the size of that illustrated in FIGURE 16 may be accommodated by the apparatus. More particularly, the wafer may be of such a length that, upon its initial drop, its rearwardmost edge; that is, the left edge in FIGURE 16, is at the position indicated by the dotted line position 132 of FIGURE 16A in which case, upon the first cycle of forward movement of the slide 63, after the wafer has been dropped, the finger 67 pushes the wafer forward. Alternatively, the wafer may have a length as indicated by the dotted line 133 in FIGURE 16A in which case, upon the first cycle of forward movement of the slide 63, the wafer is pushed to the right by the finger 68 and upon return movement of the slide, the guide block 21 is carried with it and feeds another wafer. Therefore, if a wafer has a length such that its rearward edge lies along the dotted line 133, a wafer is fed each time the slide 63 is carried forward and then rearward.

In order for the apparatus to operate properly as will be indicated by subsequent discussion of the control circuitry, limit switches are required for sensing when the slides 63 have attained its rearward position and forwardmost position. Referring again to FIGURE 3 of the accompanying drawings, the piston rod 121 is recessed as at 134 and a pair of limit switches 136 and 137 have their actuators 138 and 139, respectively, extending into the slot 134 in the shaft 121. When the rod 121 has reached its forwardmost position, the switch 137 is closed, this being the condition illustrated in FIGURE 3, while when the rod 121 reaches its rearwardmost or rightmost position as illustrated in FIGURE 3, the switch 136 is closed.

Figure 17:
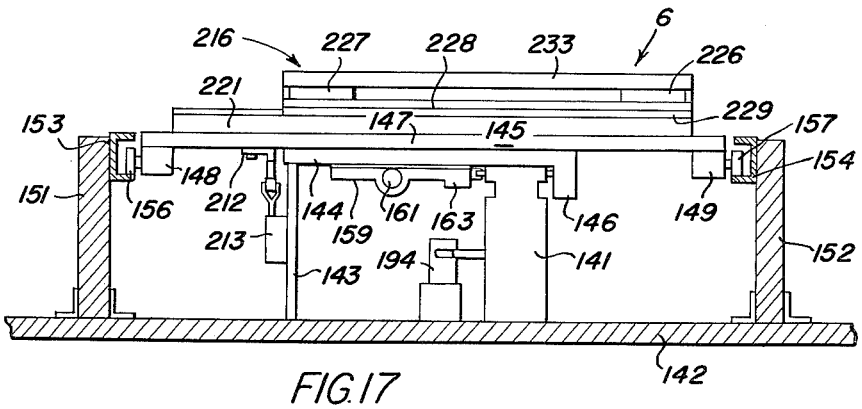
FIGURE 17 is a view in elevation taken along line 17—17 of FIGURE 2.
Figure 20:
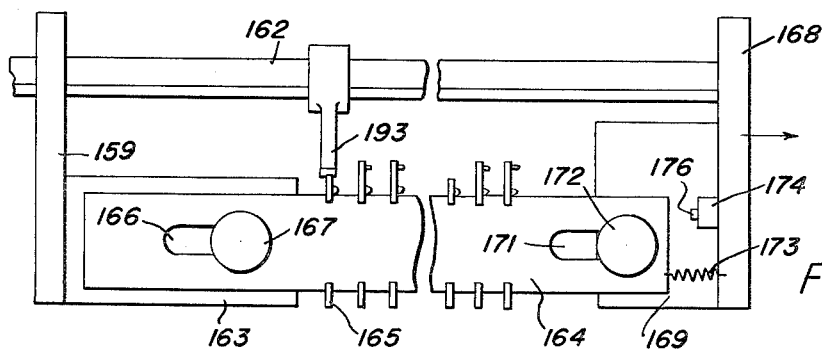

Referring now specifically to FIGURES 2 and 17 and 18, the table 6 is supported with respect to the horizontal table 2, by means of an upstanding elongated block 141 which is secured to a bed 142 of the table 2. Also extending upwardly from the bed 142 is a plate 143 which is parallel to the elongated block 141 and co-extensive therewith with respect to length. Disposed above the block 141 and the plate 143 is a table 145 including a horizontal member 144 having at its right edge, as illustrated in FIGURE 17, a downwardly depending leg 146 which is spaced closely adjacent to the right edge of the block 141. Disposed above and secured to the support member 144 is a plate 147 which is wider than the member 144 and has depending down from its opposite left and right edges, respectively, metallic bars or table side members 148 and 149. Positioned outwardly from the bars 148 and 149 are two upstanding table guiding members 151 and 152 which are secured to the bed 142 of the horizontal table 2 and which extend from adjacent the front edge thereof (see FIGURE 2) substantially to the rear edge thereof. Supported along the inner surfaces of the walls 151 and 152 are rails 153 and 154 which provide tracks for a plurality of rollers 156 and 157 that extend outwardly from the side bars 148 and 149. Thus, the table 145 comprising the support member 144, the plate 147 and the side rails 148 and 149 are movable with respect to the support members 141, 143, 151 and 152 and specifically supported by the rails 153 and 154 in cooperation with the rollers 156 and 157. The plate 147 has an aperture which need be only large enough to permit access to the underside of the wafer by the stapling mechanism; that is, the aperture 158 permits the lower member of the stapling mechanism to contact the wafer.

Secured to the under side of the support member 144 between the vertical support members 141 and 143 is an end bracket 159 which is bolted to the member 144 and has a circular aperture 161 formed therein for supporting a rod 162 (see FIGURES 2, 18, 19 and 20). The bracket 159 has an under turned tab 163 which supports one end of a tab bar 164. The tab bar is provided with a slot 166 through which passes a stud or rivet 167, the stud having a head overlying the bar 164 and a body portion which passes through the slot 166 and is seated or secured in the tab 163. Displaced from the end support 159 by a distance somewhat greater than the total maximum movement of the table 145 relative to the support members 141 and 143, is a second end bracket 168 which supports the other end of the rod 162 and is provided with an underturned tab 169 which supports the end of the tab bar 164 opposite from the end supported by the tab 163. The end of the bar 164 supported by the underturned tab 169 is provided with a slot 171 through which passes a stud 172. A spring 173 is employed to urge the tab bar 164 toward the right as viewed in FIGURES 19 and 20; that is, towards the rear of the table 2. A switch 174 is mounted on the bracket 168 and has an actuator 176 directed toward the rod 164. The actuator 176 is contacted by the bar 164 when the bar is permitted to shift to the right, in FIGURE 20, for purposes which become apparent subsequently. The tab bar 164 is provided with a plurality of selectively settable tab stops 165 which are shiftable perpendicularly of the bar.

The downwardly depending leg 146 of the support plate 144, which extends from the front of the table 145 to the aperture 158, is recessed along its entire length in horizontal alignment with the tab bar 164. Referring particularly to FIGURES 18 and 19 disposed within the recess in the leg 146 there is a ratchet plate 177 having a saw tooth edge directed towards the support bar 141. The support bar 141 is provided, at its end adjacent the end support 168 for the tab bar 164, with a rectangular recess 179 in which is disposed a pawl mechanism generally designated by the reference numeral 181. The mechanism 181 comprises an oblong shaped member 182 having a stud 183 passing through one end thereof and rotatably securing the member 182 to the upper surface of the block 141 immediately adjacent its end. The member 182 is provided with a horizontal slot 184 which extends from the end of the member 182 remote from the pin 183 to a region adjacent to the pin 183 and extends about half way through the member 182 in a direction perpendicular to its length. Referring specifically to FIGURE 19, the recess 184 provides a region in which is seated a pawl 186 that is pivoted about a pin 187 and is biased outwardly from the member 182 by a spring 188. A stud 189 cooperates with the shoulder 190 on the pawl 186 to limit outward movement of the pawl. The pawl is provided with a saw-tooth shaped tooth 191 which is adapted to engage the teeth 178 of the ratchet plate 177. It will be noted that the tooth 191 on the pawl 186 is shaped such that when the pawl is placed between the teeth 178, it prevents movement of the bar 177 to the right as viewed in FIGURE 19, but permits movement of the bar to the left since upon such movement the sloping surface of the tooth 191 engages sloping surfaces of the teeth 178 and the resultant force causes the pawl 186 to rotate about the pin 187 and permit passage of the teeth under the pawl. The member 182 has a saw tooth 192 extending outwardly therefrom towards the tab bar 164. In the normal position of the member 182, as is illustrated in FIGURE 19, the tooth 192 is disposed in the path of those tabs 165 that are in their operative position, which is toward the tab bar 164, and therefore prevents movement of the tab bar 164 to the right as illustrated in FIGURE 19; that is, towards the rear of the table 2. Thus, since the member 164 is secured to the table mechanism, the table mechanism is prevented from moving to the right. Also the pressure exerted by the stationary member 182 forces the tab plate 164 against the force of the spring 173 toward the front of the machine so that the plate 164 is out of engagement with operator 176 of the switch 174.

Upon movement of the member 182 counterclockwise, as viewed in FIGURE 19, the finger 192 becomes disengaged from the stop 165 with which it was previously in engagement and the tooth 191 of the pawl 186 becomes disposed between teeth on the ratchet bar 177. The tabs 165 and teeth 178 are arranged with equal spacing therebetween but shifted along the direction of movement of the plate by about half a tooth or about half the displacement between teeth so that upon rotation of the member 182 about the pin 183 the entire mechanism is permitted to shift slightly to the right before the engagement between the tooth 191 of the pawl 186 and the teeth 178 of the bar 177 prevent further right hand movement. Also upon the tooth 192 becoming disengaged from the tabs 165, the entire plate 164 shifts to the right as viewed in FIGURE 19 and the tab 165 passes by the finger 192 and also effects actuation of the switch 174. Upon the member 182 being released and being returned to the position illustrated in FIGURE 19, the entire mechanism may shift to the right until the finger 192 engages another depressed tab 165. The tabs 165 may be displaced from one another along direction of movement of the table 145 by predetermined distances appropriate to the particular mechanism with which the invention is employed. The various tab members may be set by rotating the bar 162 which carries a tab depressor 193. The tab depressor 193 may be positioned behind any predetermined tab by movement of the rod 162 along direction of movement of the support plate 144 and then rotating the rod until the tab depressor 193 engages the rear of the selected tab 165 and presses it towards the support 141. All of the tabs 165 may be reset to the unactuated position by moving the table to its far right position as viewed in FIGURE 19 and then returning it to its far left position while maintaining the member 182 in the position illustrated in FIGURE 19. In such an operation, the sloping right hand surface of the tooth 192 engages the tabs 165 and presses them upwardly as viewed in FIGURE 19 or in a direction away from the support member 141. It can be seen that by preselecting the positions of the depressed tabs 165 and selectively rotating the member 182 counterclockwise and then clockwise, the table may be moved to the right by preselected increments so as to position preselected portions of the wafer 4 under the head 7.

In order to selectively shift or rotate the member 182 counterclockwise about the pin 183 there is provided a solenoid 194 having an armature 196 which comprises a rod having two right angle bends therein. The first bend is a right angle bend in the horizontal plane which produces a horizontal length 197 that enters a circular transverse aperture 198 in the support member 191 below the recess 179. A further right angle bend in the vertical plane produces an upwardly extending length 199 which passes through a vertical slot 201 in the member 141, the slot 201 extending between the circular aperture 198 and the recess 179. The length 199 of the armature 196 passes through and is secured in the end of the member 182 remote from the pin 183, and the entire mechanism 181 is biased for clockwise rotation about the pin 183 by means of a spring 202 which is secured to the armature at the intersection of the lengths 197 and 199 and passes through the aperture 198 to an external support or post which is not illustrated. Energization of the magnet 194 produces counterclockwise movement of the member 182 and the sequence of events described above follows as a result.

In order to produce movement of the table toward the rear of the machine, there is provided a pneumatic servo motor 203 (see FIGURE 22) supported under a plate 204 secured to the rear of the table 2. The motor is supplied with pneumatic fluid via hoses 206 and 207 and has a piston rod 208 (see FIGURES 2, 18, 22 and 23) which passes through and is supported in an upstanding plate 209 at the rear of the table 2. The end of the piston rod 208 remote from the motor 203 is slotted and fits over the end of the plate 147 to which it is secured as by means of a pin 211. Thus, when hydraulic fluid is applied to the hose 206, the table is biased to the right as viewed in FIGURES 19 and 23 and to the left as viewed in FIGURE 18.

Secured to the underside of the plate 147 is an L-shaped bracket 212 having one of its legs extending vertically downward from the plate 147 adjacent the left edge as viewed in FIGURE 17 of the support plate 144. Disposed at the two limits of the path of movement of the member 212 are a pair of limit switches 213 only the forward one of which is illustrated in FIGURE 17. The switches 213 are mounted on the left side of the plate 143 and the specific switch 213 illustrated in FIGURE 17 senses maximum movement of the table to the right as viewed in FIGURE 18. A similar switch is located at the other end of the member 212 to sense maximum movement of the table to the left as viewed in FIGURE 18.

Secured to the top of the plate 147 is a wafer holding mechanism generally designated by the reference numeral 216. (See FIGURES 18, 17, 23 and 24.) The mechanism comprises a cross member 217 secured to the plate 147 adjacent its right edge as viewed in FIGURE 23. The member 217 has a triangular shaped projection 218 and to the right thereof an upwardly extending abutment 219. Spaced a predetermined distance from the bracket 217 is an inverted L-shaped bracket 221 having its leg extending in a direction opposite to the member 217. The members 217 and 221 extend substantially across the width of the plate 147 perpendicular to its direction of movement. The members 217 and 221 provide supports for the wafer holder 216 and permit the wafer holder to slide with respect to the plate 147 in a direction perpendicular to the direction of movement of the table 145. A guide block 222 is provided with an inverted V-shaped groove 223 so that the block rests on the member 217 and the triangular projection 218 of the member 217 is seated in the V-shaped groove 223 in the guide block 222. A vertically extending block 224 is disposed between the guide block 222 and the vertical abutment 219 of the cross member 217. The members 222 and 224 are secured to one another to form a rigid cross slide which is guided by the triangular tooth 218 and the abutment 219 of the block 217.

Secured to the top of and at opposite ends of the block 222 are flat elongated rectangular plates 226 and 227. The elongated plates 226 and 227 are secured together by a further cross member 228 bolted to the under side of both of the plates and having a shoulder 229 underlying the leg of the inverted L-shaped bracket 221. The members 222, 223, 226, 227 and 228 form a rigid generally rectangular open framework which is positively positioned with respect to the plate 147 insofar as direction of movement of the table 145. However, due to the method of construction; that is, the shoulder 229 underlying the leg of the support 222 and the V-block arrangement, the entire apparatus 216 may move perpendicular to the direction of movement of the table 145.

Disposed above the block 222 and bolted to the block and to the arms 226 and 227 is a plate 231 having a rectangular groove 232 formed in a vertical edge thereof facing the bracket 228. In order to be able to accommodate wafers of varying width; that is, wafers which vary in dimension parallel to the direction of movement of the table 145, there is provided a cross member 233 which is parallel to the cross member 231 but which may be moved along the length of the legs 226 and 227 so as to permit the spacing between the members 231 and 233 to be varied. More particularly, the outer edges of the legs 226 and 227 are provided with teeth 234 and 236, respectively; the on-center spacing between the teeth being equal to the on-center spacing between the teeth 99 on the shafts 94 and 96 of the wafer feeding mechanism 5. Thus, when the wafer holding mechanism 216 is positioned adjacent the wafer feeding mechanism in order to receive a wafer the cross member 233 may be positioned so that it is aligned with the block 11 of the wafer feeding mechanism. As illustrated in FIGURE 18, a conventional pawl and ratchet arrangement is employed for selectively engaging and disengaging the pawl from the teeth 223 and 236 so that when the pawls are disengaged the member 233 may be slid along the rails to any desired position and thereafter positively retained in the position by releasing the pawls and permitting them to engage the teeth 234 and 236. The cross member 233 is provided with a groove in its vertical surfacing facing the cross bracket 231 and the wafers 4 are snugly received in the grooves 232 and 235.

In order to move the wafer holder 216 transverse to the direction of movement of the table 145, there is provided a hydraulic motor 238 which is supported between the end walls 151 and 152 below the movable table 145. The motor 238 is provided with a piston rod 239 which extends through suitable apertures in the side walls 151 and 152 and terminates in its opposite ends in fingers 241 and 242 which extend perpendicular to the shaft 239. The ends of the fingers 241, 242 remote from the shaft 239 engage opposite ends of a shaft 243 which extends parallel to the piston rod 239 and is slidably supported in the walls 151 and 152. Upon movement of the piston 239 in response to the application of hydraulic fluid to the motor 238, the shaft 243 is caused to move with the piston rod 239 in a direction perpendicular to the direction of movement of the table 145. A collar 244 is disposed about the shaft 243 between the walls 151 and 152 and is movable with the shaft. The collar 244 has an upstanding arm 246 having a cross section which is elongated in a direction perpendicular to the axis of the shaft 243. The upper end of the member 246 is disposed between parallel 247 and 248 of a yoke 249 which is secured to the under side of the plate 231. More specifically, the yoke passes under the table 145 and has an upturned end portion 251 (see FIGURE 23) which extends upwardly through the aperture 158 in the plate 147. The upturned member 251 terminates in a horizontal member 252 which underlies the cross member 231 of the wafer support 216 and is bolted thereto. Thus, as the shaft 243 is moved transversely of the table 145, the yoke 249 is carried therewith due to the connection between the shaft and the yoke and the wafer supporting mechanism 216 moves therewith.

It is apparent from the above description that the table 145 is moved selectively toward the front or rear of the machine to produce one direction of movement of the wafer 4 while the wafer holder 216 is moved transversely to the direction of movement of the table 145 and provides a second degree of movement of the wafer with respect to the head 7. In consequence, within the limits of movement of the table 145 and the wafer holder 216 any predetermined location of the wafer may be positioned under the operating head 7. Further, as a result of the specific wafer feeding mechanism 5, three different segments of a large board; that is, a board which is three times as large as the lateral movement provided by the motor 238 may each have predetermined segments of its areas positioned under the head each during a different cycle of transverse movement of the holder 216 and longitudinal movement of the table 145.

As previously indicated, the motor 238 is utilized to produce transverse movement of the wafer holding mechanism 216. The motor 238 is adapted to cause the wafer holder 216 to assume one of a plurality of distinct positions and referring now specifically to FIGURE 25 of the accompanying drawings, the servo motor 238 comprises a hollow cylinder 253, the ends of which are closed by end caps 254 and 256. The end caps 254 and 256 are provided with small passages 257 and 258 respectively which are connected via fittings 259 and 261 with a source of pneumatic fluid under pressure so as to apply equal pressures to both ends of the cylinder 253. A piston 262 is secured to the shaft 239 which slides in the pressure sealing bearings 263 in the end caps 254 and 256. The areas of the opposite sides of the piston 262 are equal so that since equal pressures are supplied through the passages 257 and 258, equal forces are exerted on both sides of the piston. A plurality of exhaust ports 264, there being seven such ports in the embodiment of the invention under discussion, are provided in the wall of the cylinder 253 and the ports 264 are distributed longitudinally of the cylinder. Exhaust conduits 266 have one end coupled to each of the exhaust ports 264 and the other end connected to a single exhaust line 267. Disposed in each of the lines 266 between each of the ports 264 and the exhaust line 267 are solenoid operated valves 268 through 274 only two of which are illustrated in FIGURE 25, but all of which are schematically illustrated in FIGURE 27. The exhaust valves 268 through 274 are normally closed so that the pressure on both sides of the piston 262 are equal. The exhaust ports 264 and lines 266 are of larger diameter than the inlet lines 257 and 258 so that opening of any one of the valves 268 through 274 exhausts pneumatic pressure from one side of the piston 262 and the pressures on the opposite sides of the piston 262 are thus unbalanced. The piston is moved by the unbalanced pressure until it covers and closes the open port and the pressures are again balanced. When the position of the open port has been reached and the port covered, the pressure in the line 267 drops. A pressure responsive switch 276 (see FIGURE 22) which is normally maintained open by exhaust gases derived from the exhaust line 267, closes and controls further operation of the system, as will become apparent upon description of the system operation with respect to FIGURE 27. The switch 276 has an operating arm 277 one end of which overlies a port 278 in the bottom wall 142 of the table 2. The port 278 communicates with the exhaust line 267 and therefore whenever pressure builds up in the line 267, the arm 277 is moved upwardly to open the switch 276, whereas when the exhaust pressure is removed the arm falls and the switch is closed.

Two additional exhaust ports 279 and 281 are provided in the motor 238 at the extreme opposite ends of the cylinder 253. The ports 279 and 281 communicate respectively with exhaust lines 282 and 283 and are controlled by solenoid-operated valves 284 and 286 respectively. When it is desired to cause the piston 262 to assume either one or the other of its extreme positions as determined by ports 279 and 281, one of the solenoid-actuated valves 284 or 286 is open and the obtention of either of these two extremes is signalled by limit switches 287 and 288 which have their operating members disposed in line with the movement of the piston shaft 239. Alternatively, the motor may be moved to its extremes by, for instance, disconnecting the inlet port 261 from the air supply and exhausting it to the atmosphere. The actuators of the switches 287 and 288 are operated when the shaft 239 reaches one or the other of the limits of its movement.

As previously indicated, the wafer holder 216 is capable of attaining seven intermediate positions in accordance with one embodiment of the invention so that any of the seven transverse areas of the wafer may be presented to the operating head 7. In order to retain the wafer holder 216 in each of these seven positions, there is provided a detent motor 289 and reference is now made specifically to FIGURE 26 of the accompanying drawings. The motor 289 comprises a piston 292 which is urged upwardly by a helical spring 293. An inlet passage 294 conveys pneumatic fluid under pressure from an input conduit 296 to the top of the piston 292 so that when pressure is applied to the conduit 296 the piston 292 is moved downwardly against the force of the spring 293. The piston 292 carries a pin 297 having a tapered lower end 298 which mates with indentations 291 in the cross member 231 of the wafer mechanism 216. When the wafer holder 216 is to be moved to a new position, the pressure is removed from the line 296, and therefore from over the top of the piston 292 and the spring 293 moves the piston 292 and the pin 297 upwardly so that the wafer supporting carriage 216 is free to move with respect to the motor 299. When the wafer support 216 has attained a new position, pressure is again applied to the pneumatic line 296 and the piston 292 and pin 297 move downwardly into one of the depressions 291 so that the carriage 216 is positively and accurately maintained in position.

In the operation of the apparatus, assuming initially that the wafer holder 216 does not have a wafer therein, the table 145 is returned to its forward position adjacent the front of the table 2 as illustrated in FIGURE 2, and then the wafer holder 216 is moved to its extreme left position toward the wafer feeding mechanism. When the wafer holder 216 has moved towards its extreme left position, the servo motor 122 is supplied with fluid via the hose 123 and the slides 63 are moved forwardly. After the slides 63 have attained their forwardmost position, the motor 122 is supplied with fluid via the hose 124 and returns the slides 63 to their rearwardmost position. If it is assumed that a wafer was initially positioned on the surfaces 60 of the plate 38, then forward movement of the guides 63 moves the wafer one-third of its maximum distance into the slots 232 and 235 formed in opposed surfaces of the members 231 and 233 of the wafer holder 216. The stapling head is located such with respect to the table 6 that the first one-third section of a wafer presented to the table cannot be moved under the head. Therefore, during a starting operation (that is, when the machine is being put into operation with no wafers initially positioned on the table 6) two successive feeding cycles must be performed to place the first one-third of the wafer in such a position on the table 6 that it can be presented to the head. At the termination of the second feeding cycle and upon the slides 63 being returned to their rearwardmost positions, the wafer holder 216 is returned to its righthandmost position as viewed in FIGURE 2 and immediately thereafter the table 145 is moved toward the rear of the table 2 until it has attained the first desired position under the head 7 as determined by the positions of the tabs 165. Immediately thereafter, the selected ones of the solenoid valves 268 through 274 are energized sequentially and successively to move the wafer holder 216 so as to present any one or all of the seven predetermined transverse positions available across the first one-third section of the wafer to the stapling head. Thereafter the table 145 is moved another predetermined distance towards the rear of the table 2 as determined by the settings of the tabs 165 on the tab bar 164 and the wafer holder 216 is moved transversely again to any preselected position. When all of the areas of the first one-third of the card have been operated upon or one-half or all of the card depending upon its size, the table 145 is moved to its forward position, the wafer holder 216 is moved to the extreme left position and another wafer or another portion of the wafer already in the mechanism is moved into position for operation upon by the head 7. Assuming a full size wafer and continuing with the above example, during the third feed cycle, the wafer becomes centrally positioned in the members 231 and 232; and the central one-third section of the wafer is presented to the head. At the end of this stapling cycle the table again moves to the feeding mechanism, and a new wafer is inserted which moves the last one-third of the wafer already on the table into a position to be operated on by the stapling head.

Referring now to FIGURE 27 of the accompanying drawings, there is illustrated a wiring diagram of the complete control mechanism for the apparatus of the present invention. As previously indicated, the machine of the present invention is under the control of a card reader, which, in response to completion of predetermined cycles of movement of the various movable elements of the mechanism applies appropriate voltages to the various members of the control mechanism illustrated in FIGURE 27. More specifically, the card reader applies voltages to one of the terminal positions 5 through 11 of a terminal block 301 to selectively control opening of one of the valves 268 through 274 to control the positioning of the servo motor 238. Further, the card reader applies a voltage to a terminal 13 whenever it is desired to produce movement of the table 145. When a voltage is applied to the terminal 4, the card reader, in response thereto, selects a particular component to be fed to the operating head 7 of the mechanism whereas, when a voltage is applied to the output terminal 3, the head itself may be actuated or, if a transfer voltage had previously been applied to terminal 13, it is removed. Alternating power for the apparatus is applied via the terminal 12 of the terminal block 301 and the ground return for the A.C. power is on the terminal 1. Further, an electromagnetically actuated counter is connected in series with the terminal 14 so that when the wafer feed switch 131 is closed in response to a feeding of a wafer the counter is connected in series with alternating current and energized to produce an indication that one wafer has been fed.

In operation, assuming that initially a wafer is in position in the wafer holder 216, the card reader or any other control apparatus which may be manual or automatic applies a voltage to any one of the terminals 5 through 11 and energizes one of the solenoids 268' through 274' which control the valves 268 through 274. In consequence, the servo motor 238 is moved to a position such that its piston 262 closes the exhaust port. It will be noted that initially a solenoid 308 is energized via lead 307, contacts 305 of a solenoid 306, lead 304, exhaust switch 276, lead 303 and terminal 12. When solenoid 308 is energized, valve 309 is open and hydraulic fluid is applied via hose 296 to motor 289 and the wafer holder 216 is retained. As soon as one of the valves 268 through 274 is energized, the exhaust switch 276 is switched from the position illustrated to its opposite position, removes voltage from solenoid 308 to free the holder 216, and applies a voltage via a lead 302 to the terminal 4 which indicates that the card reader can now select the component. When the piston 262 has attained its final position and the exhaust port is covered, the switch 276 returns to the position illustrated in FIGURE 7 and again applies a voltage to solenoid 308 to retain the carriage 216. The voltage applied to the lead 304 is also directed via a lead 311, the tab shift switch 174 and lead 312 to the third terminal of the terminal block 311 which voltage indicates that the wafer holder 216 is now in a predetermined position and the head 7 may be actuated.

When all of the components or other components have been inserted in or functions performed on a single row of the wafer as determined by each position of the table 145, the card reader applies a voltage to the transfer terminal 13 which voltage is applied via a lead 313 and a lead 314 to the solenoid 306 which is returned to ground via a lead 316. Energization of the solenoid 306 opens the contacts 305 and deenergizes the solenoid 308 for purposes to be described subsequently. The transfer voltage applied to the lead 313 is also applied through the contacts of the limit switch 287 to a lead 317 and through a time delay solenoid 318 to a ground return lead 319. The voltage on the lead 317 is also applied through closed contacts 321 of the solenoid 318 to a lead 322 and via leads 322 and 323 to the solenoid 194 which pulls the member 182 to the right as viewed in FIGURE 1 so as to disengage the tooth 192 from the tab bar 164 and engage the pawl 191 with the saw teeth 187 of the ratchet bar 177. The table 145 is biased to move toward the top of the page of FIGURE 27 by means of the servo motor 203 which receives pressurized hydraulic fluid via the conduits 207 and 208. Fluid flow to the conduits 207 and 208 is controlled by valves 324 and 325 respectively which are in turn controlled by solenoids 326 and 327 respectively. The valves 324 and 325 are such that when the solenoids 326 and 327 are deenergized, fluid under pressure is applied to the lead 206 but is not applied to the lead 207. Consequently, the piston shaft 208 of the motor 203 is biased to move upwardly as viewed in FIGURE 27 since both solenoids are normally de-energized as illustrated. Upward bias is applied to the table 145 and thus, as soon as the tooth 192 is disengaged from a tab 165 of the tab bar 164, the table 145 shifts upwardly by a small predetermined amount determined by the play between the tooth 191 and the teeth 187 of the ratchet bar 177. As soon as the tab bar 164 is released, it shifts upwardly under the force of its spring and the switch 174 is opened. Opening of the switch 174 removes voltage from the lead 312 and therefore removes the voltage from the terminal 3 of the block 301. The mechanism is such that so long as voltage appears on the terminal block 3, the consequent insertion mechanism; that is, the head assembly 7, is energizable and therefore the head assembly 7 is rendered inoperative as soon as the tab bar 164 shifts.

After a predetermined length of time as determined by the time delay of the solenoid 318, its contacts 321 are open and voltage is removed from the solenoid 194 so that the member 182 is permitted to move to the left as viewed in FIGURE 27 and the pawl 191 becomes disengaged from the teeth 87 of the bar 77. The table is now free to shift towards the back of the horizontal table 2 under the influence of the motor 203 until the tab bar advances a sufficient distance to bring another tab 165 into engagement with the tooth 192. At this time the bar 164 is against shifted into the position illustrated in FIGURE 27 and the switch 174 is closed. Voltage again appears on the terminal 3 which signals the card reader or other external control mechanisms to remove voltage from the transfer A.C. input terminal 13. The mechanism is now free to again apply voltages to the various terminals 5 through 11 to control the servo motor 238 and such operation continues until another transfer signal is applied from the card reader.

The sequential operation of shift and transfer continues until a transfer signal is received which causes the table 145 to reach its maximum rearward position at which time the limit switch 214 is closed. The movable contact of the limit switch 214 is connected via a lead 326 to a normally closed set of contacts 327 of a latching relay 328 having a latching coil 329 and an unlatching coil 331. The other side of the contacts 327 are connected via a lead 328 to the lead 317 so that when transfer voltage is on the terminal 13, a voltage is applied to the movable contact of the limit switch 214. The stationary contact of the limit switch 214 is connected via a lead 332 to the latching coil of the latching solenoid 328, the other terminal of which is connected to a ground lead. The solenoid 328 has two sets of contacts 334 and 335 in addition to the contacts 327 and both of the sets of contacts 334 and 335 are normally open. When the coil 329 is energized, the contacts 327, 334, and 335 all shift their positions and are maintained in the shifted position until the unlatching coil 331 is subsequently energized. With the contacts 334 and 335 closed, voltage is applied via the contacts 334 to the solenoids 326 and 327 for operating the valves 324 and 325. The valves are now operated so that pressurized fluid is removed from the lead 206 and is applied to the input lead 207 and the motor 203 moves the piston rod 208 to its forwardmost position with respect to the table 2 or its downwardmost position as illustrated in FIGURE 27.

The closing of the contacts 325 provides a by-pass for the contacts 321 of the time delay solenoid 318 and the solenoid 194 is maintained energized via lead 317, a further lead 332, a lead 337 which is connected to lead 332, the contacts 335, and a further lead 338 which is connected to the lead 323 that supplies the solenoid 194. Thus, the element 182 is moved to the right as illustrated in FIGURE 27, but since the table is moving downwardly the angle on the pawl 191 and teeth 187 is such that the pawl does not hinder movement of the table. Also since the tooth 192 is removed from the path of movement of the tabs 165, the tabs are not reset. Upon the table 145 reaching its forwardmost position, the limit switch 213 is closed and applies voltage via a lead 341 and contacts 342 of a latching solenoid 343 to a solenoid 344 which opens the valve 286. In consequence of opening of the valve 286, the piston rod 239 of the servo motor 238 is shifted to the far left as illustrated in FIGURE 27 which brings the wafer holder 216 to its position closest to the wafer feeding mechanism 5, and more particularly, causes the wafer holder 216 to be brought substantially into engagement with the mechanism 5 with the wafer supports 231 and 233 aligned with the ledges 80 of the plates 38 of the wafer feeding mechanism 5.

Upon the motor 238 reaching its far left position as illustrated in FIGURE 27, the limit length switch 288 is closed, and voltage is applied through the swtich 288 to a latching coil 346 of a latching solenoid 347. Energization of the coil 346 closes contacts 348 of the solenoid 347 and the voltage derived from the lead 341 and the switch 288 is applied through the now closed contacts 348 of the solenoid 347 to a further lead 349. The lead 349 is connected through normally closed contacts 351 of a latching solenoid 352 to a further solenoid 353 which controls a valve 354 for applying fluid to the input hose 123 of the servo motor 122. In consequence, the servo motor moves the slide 63 forward and either causes a wafer which is already in the wafer holder 216 to have a new section moved into a position which can be placed under the head 7 or inserts the first portion of a new wafer into the wafer holder 216. Upon the motor 122 reaching its forwardmost position, the forward limit switch 136 is closed and applies a voltage via a lead 356 to a latching coil 357 of the latching relay 352. Energization of the latching coil 357 causes the contacts 351 to assume a position other than that illustrated and voltage is applied via lead 360 to a solenoid 358. Energization of the coil 358 opens the valve 359, which upon opening, permits hydraulic fluid under pressure to be applied to the input hose 124 of the servo motor 122. Application of fluid to the hose 124 causes the piston of the motor 122 to assume its rearward position or its leftmost position as illustrated in FIGURE 27. Upon the piston assuming its leftmost position, the limit switch 137 is closed and voltage, which is applied to the movable contact thereof via leads 360 and 361 is connected via a lead 362 to a latching coil 363 of the latching solenoid 343. Energization of the coil 363 causes the contacts 342 of the solenoid to assume a position opposite to that illustrated and applies voltage to a lead 364 which is connected to a solenoid 366. Energization of the coil 366 opens the valve 282 which effects movement of the servo motor 238 to its rightmost position as illustrated in FIGURE 27. This opens the limit switch 288 and when the wafer holder 216 reaches its far position and moves the limit switch 287 to a position opposite to that illustrated in FIGURE 27, the fluid pressure which caused movement of the motor 238 to the right as illustrated in FIGURE 27 is removed and the impact of the piston 262 against the end plate 256 causes the motor to bounce away from its extreme right position and therefore, the swtich 287 again assumes the position illustrated in FIGURE 27. The need for the solenoid 306 now becomes apparent. Since, upon the table reaching its extreme righthand position, the requirement for position of the motor 238 is met and the pressure in the exhaust line of the motor 238 falls, the pressure switch 276 assumes the position illustrated in FIGURE 27 and in the absence of the solenoid 306 and its contacts 305, the motor 289 would be energized and would attempt to retain the table. However, as previously indicated, the wafer holder 216 must be free to bounce off of its extreme right hand position so as to clear the limit switch 287 and therefore the solenoid 306 is employed to maintain the motor 289 de-energized whenever a transfer voltage is applied to the terminal 113. Although the limit switch 287 is closed for only a brief interval, closure of the switch applies to the tranfer voltage from the terminal 13 to a lead 367. The lead 367 is connected to the reset coils 368, 369, 371 and 331 of the latching solenoids 343, 347, 352, 328 respectively. Energization of each of these reset windings causes the contacts associated with the relays 343, 347, 352, and 328 to assume their respective positions as illustrated in FIGURE 27. In consequence of the relay 328 being unlatched, fluid is again applied to the input tube 206, to the motor 203 and the motor is biased upwardly as viewed in FIGURE 27 and rearwardly of the table 2 as viewed in FIGURES 1 and 2. Also, the holding circuit for the solenoid 194 through the contacts 335 is opened and the member 182 is released so that the table 147 may assume a first predetermined position as determined by the position of the first actuated tab 165 on the tab bar 164. Movement of the table 174 causes the limit switch 213 to be opened and the shift detecting switch 174 to be closed. Closure of the switch 174 causes a voltage to be applied via the lead 312 to the terminal 3 and signals the card reader that the operation is completed. Immediately thereafter voltage is removed from the terminal 13 and voltage is applied to one of the terminals 5 through 11 to position the card holder 216 to one of its predetermined transverse positions.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A mechanism for successively feeding to a wafer receiving device the lowermost unit of a stack of relatively thin and rigid wafers, said mechanism comprising a guide means for said wafers, means for dropping a first lowermost wafer of said stack onto said guide means while supporting the remainder of said stack of wafers, wafer driving means repetitively movable between a first and a second position, said wafer driving means moving a wafer on said guide means a predetermined distance toward said wafer receiving device upon each movement of said wafer driving means from said first to said second position, and control means for causing said means for dropping to drop a second lowermost wafer onto said guide means in response to said first lowermost wafer obtaining a predetermined position relative to said guide means.

2. A mechanism for successively feeding to a wafer receiving device the lowermost unit of a stack of relatively thin and rigid wafers, said mechanism comprising a guide means for said wafers, means for dropping a first lowermost wafer of said stack onto said guide means while supporting the remainder of said stack of wafers, wafer driving means repetitively movable between a first and a second position, said wafer driving means moving a wafer on said guide means a predetermined distance toward said wafer receiving device upon each movement of said wafer driving means from said first to said second position, and control means for causing said means for dropping to drop a second lowermost wafer onto said guide means in response to said first lowermost wafer obtaining a predetermined position relative to said guide means, the predetermined distance of movement imparted to a wafer by said wafer driving means being at the maximum approximately equal to the length of the wafers along their direction of movement by said wafer feeding means and at the minimum equal to a submultiple of said length.

3. A mechanism for successively feeding to a wafer receiving device the lowermost unit of a stack of relatively thin and rigid wafers, said mechanism comprising a guide means for said wafers, means for dropping a first lowermost wafer of said stack onto said guide means while supporting the remainder of said stack of wafers, wafer driving means repetitively movable between a first and a second position, said wafer driving means moving a wafer on said guide means a predetermined distance toward said wafer receiving device upon each movement of said wafer driving means from said first to said second position, and control means for causing said means for dropping to drop a second lowermost wafer onto said guide means in response to said first lowermost wafer obtaining a predetermined position relative to said guide means, the predetermined distance of movement imparted to a wafer by said wafer driving means being approximately equal to a submultiple of the length of the wafers along their direction of movement by said wafer feeding means.

4. A mechanism for successively feeding to a wafer receiving device the lowermost unit of a stack of relatively thin and rigid wafers, said mechanism comprising a guide means for said wafers, wafer feeding means for dropping a lowermost wafer of said stack onto said guide means, an actuating means reciprocatable between one and another position for causing said feeding means to drop the lowermost wafer of said stack, wafer driving means repetitively movable between a first and a second position, said wafer driving means moving a wafer on said guide means a predetermined distance toward said wafer receiving device upon each movement of said wafer driving means from said first to said second position, and control means for coupling said feeding means to said actuating means in response to a wafer obtaining a predetermined position relative to said guide means.

5. A mechanism for successively feeding to a wafer receiving device the lowermost unit of a stack of relatively thin and rigid wafers, said mechanism comprising a guide means for said wafers, feeding means for dropping a lowermost wafer of said stack onto said guide means, an actuating means reciprocatable between one and another position, wafer driving means reciprocatable between first and second positions in response to movement of said actuating means between said one and said other position, said wafer driving means moving a wafer on said guide means a predetermined distance toward said wafer receiving device upon each movement of said wafer driving means from said first to said second position, coupling means secured to and movable with respect to said actuating means, control means for moving said coupling means into driving engagement with said feeding means in response to a wafer obtaining a predetermined position relative to said guide means, said feeding means thereafter dropping a lowermost wafer of said stack onto said guide means upon movement of said actuating means between said other and said one position.

6. The combination according to claim 5 further comprising means for disengaging said coupling means from said wafer driving means and when said actuating means is in said one position.

7. The combination according to claim 6 wherein said feeding means comprises a pair of slides disposed on opposite sides of said wafers, said slides being engageable by said coupling means and movable therewith upon movement of said actuating means, a plurality of cams carried by each of said slides, a plurality of opposed reciprocatable cam follower plates disposed along opposite edges of said wafers, one of said pairs of cam follower plates disposed under the lowermost wafer of said stack, another of said pairs of cam follower plates between aligned with the second lowermost wafer of said stack, said cam means first causing said another of said pairs of cam follower plates to engage said second lowermost wafer and then causing said one of said pairs of cam follower plates to be withdrawn from under said lowermost wafer upon movement of said slides with said coupling means.

8. The combination according to claim 5 wherein said control means comprise arms secured to said coupling means and disposed under said stack, said arms being engageable by a wafer on said guide means, said arms preventing said coupling means from engaging said feeding means when said arms are engaged by a wafer and permitting said coupling means to engage said feeding means when out of engagement with a wafer and when said actuating means is in said other position, said arms becoming disengaged from a wafer upon said wafer obtaining said predetermined position relative to said guide means.

9. An apparatus for successively feeding wafers to a wafer positioning means when located in a predetermined position, and for moving said wafer positioning means to present predetermined locations on said wafer to a utilization device, said mechanism comprising control means for placing said wafer positioning means in said predetermined position, a guide means for said wafers, means for dropping a first lowermost wafer of a stack of wafers onto said guide means while supporting the remainder of said stack of wafers, said wafer positioning means having means for holding a wafer thereon, a wafer driving means repetitively movable between a first and a second position, said wafer driving means moving a wafer on said guide means a predetermined distance in a first direction onto said wafer positioning means, said control means controlling said wafer positioning means so as to cause different predetermined locations of said wafer lying in an area having a length parallel to said first direction approximately equal to said predetermined distance and a width approximately equal to the width of said wafer to be presented to said utilization device, said control means thereafter returning said wafer positioning means to said predetermined position, said wafer feeding means again moving a wafer on said guide means through said predetermined distance in said first direction onto said wafer positioning device and means responsive to said wafer obtaining a predetermined position on said guide means for causing said feeding means to drop the lowermost wafer of said stack onto said guide means.

10. A device for positioning a table at preselected positions along a path of movement of said table comprising a stationary table, a movable table supported on said stationary table for movement along a predetermined path between a first and a second terminal position, a reversible motive means for alternatively urging said movable table toward said first and said second terminal positions, a tabulator bar secured to one of said tables and having a plurality of tabulators at will positionable in a first position, a ratchet bar secured to said one table, a stop member secured to the other of said tables and movable between one and another position, said stop member engageable in said one position with said tabulators in said first position one at a time to arrest movement of said movable table toward said first terminal position only and engageable in said second position with said ratchet bar to prevent movement of said movable table toward said first terminal position, means for moving said stop member out of engagement with a tabulator with which it was previously engaged and into said other position in engagement with said ratchet bar, means for causing said tabulator bar and said stop member to shift relative to one another upon disengagement so that they shift along the direction of movement of said movable table sufficiently to prevent further engagement between said stop member and said tabulator with which it was previously engaged, and control means for thereafter returning said stop means to said one position.

11. The combination according to claim 10 wherein said control means comprises means for sensing disengagement between said tabulator and said stop means.

12. The combination according to claim 11 wherein said means for sensing comprises, means for mounting said tabulator bar for limited movement parallel to movement of said movable table, means for biasing said tabulator bar in a direction opposite to that in which it is urged by said stop means when said movable table is urged toward its first terminal position, and switch means for sensing movement of said tabulator bar toward said second terminal position of said movable table.

13. The combination according to claim 10 further comprising means responsive to said movable table obtaining said first terminal position for reversing said reversible motive means to return said movable table to said second terminal position.

14. The combination according to claim 13 further comprising a movable holding device secured to said movable table for movement perpendicular to said movable table between first and second limiting positions, and a second reversible motive means for moving said movable holding device to preselected positions between and including said first and second limiting positions.

15. The combination according to claim 14 further comprising means responsive to said movable table obtaining said second terminal position for energizing said second reversible motive means to move said movable holding device to said first limiting position.

16. An apparatus for successively feeding wafers to a wafer positioning means when located in a predetermined position, and for moving said wafer positioning means successively to present predetermined locations on said wafer to a utilization device, said apparatus comprising a movable table movable in a first coordinate direction between first and second terminal positions, a first motive means for moving said movable table in a direction toward said first terminal position in successive predetermined steps, control means responsive to said movable table obtaining said first terminal position for reversing said first motive means to move said table to said second terminal position, a wafer holder mounted on said movable table and movable relative thereto in a second coordinate direction between first and second limiting positions, a second motive means for selectively positioning said movable wafer holder in preselected positions between and including said first and second limiting positions, said control means being responsive to said movable table obtaining said second limit of movement for energizing said second reversible motive means to move said movable wafer holder to said first limiting position, a guide means for said wafers, means for dropping a first lowermost wafer of a stack of wafers onto said guide means while supporting the remainder of said stack of wafers, said wafer positioning means having means for holding a wafer therein, a wafer driving means repetitively movable between a first and a second position, said wafer driving means moving a wafer on said guide means a predetermined distance in a first direction onto said movable wafer holder, said control means being responsive to said wafer having been moved said predetermined distance for selectively energizing said reversible motive means so as to present different predetermined locations of said wafer lying in an area having a length parallel to said first direction approximately equal to said predetermined distance and a width approximately equal to the width of said wafer to a utilization device, said movable table obtaining said first terminal position after all predetermined locations in said area have been presented to said utilization device, said control means again returning said movable table to said second terminal position and said movable wafer holder to said first limiting position, said wafer feeding means again moving a wafer on said guide means through said predetermined distance in said first direction onto said wafer positioning device and means responsive to said wafer obtaining a predetermined position on said guide means for causing said feeding means to drop the lowermost wafer of said stack onto said guide means.

17. A machine for inserting selected electrical components at selected positions of a wafer which are appropriate to the components, comprising a stabling head, means for positioning said wafer with respect to said stapling head at a position appropriate to the selected one of said components, said means for positioning said wafer comprising first and second motive means for moving said wafer in distinct coordinate directions, said first motive means biasing said wafer for movement towards a first limit of movement, means for selectively releasing said wafer to move intermittently at predetermined selectable variable distances toward said first limit of movement, said second motive means selectively moving said wafer to predetermined preselectable positions between two limits of movements.

18. A machine for inserting selected electrical components at selected positions of a wafer, comprising a single stapling head, means for positioning said wafer including first and second motive means for moving said wafer in coordinate directions, control means for placing said wafer positioning means in a predetermined position, a guide means for said wafers, means for dropping a first lowermost wafer of said stack onto said guide means while supporting the remainder of said stack of wafers, said wafer positioning means having means for holding a wafer thereon, a wafer driving means repetitively movable between a first and a second position, said wafer driving means moving a wafer on said guide means a predetermined distance in a first direction onto said wafer positioning means when it is in said predetermined position, said control means moving said wafer positioning means so as to present different predetermined locations of said wafer lying in an area having a length parallel to said first direction approximately equal to said predetermined distance and a width approximately equal to the width of said wafer to said stapling head, said control means thereafter returning said wafer positioning means to said predetermined position, said wafer feeding means again moving a wafer on said guide means a predetermined distance toward said wafer positioning means, means for causing said feeding means again to drop the lowermost wafer of said stack onto said guide means, after said motive means has presented substantially the entire length of said wafer parallel to said first direction to said stapling head, and means comprising further electrical programming devices for controlling said motive means to position said wafer with respect to said stapling head at positions appropriate to the selected ones of said components.

19. In a machine for automatically fabricating an electrical subassembly, said subassembly comprising a wafer of insulating material provided with perforations in pairs at predetermined positions thereof, said wafer having printed circuitry on at least one face thereof and passing in adjacent relation to said perforations, and a plurality of components secured to the wafer by stapling, with the leads of each component passing through a pair of perforations in said wafer, said machine comprising a securing station, a device located at said stapling station for securing the components to said wafer at predetermined locations on said wafer, wafer positioning means for presenting said predetermined locations on said wafers to said securing station sequentially and successively, said positioning means including first and second motive means for moving said wafer in coordinate directions, control means for placing said wafer positioning means in a predetermined position, a guide means for said wafers, means for dropping a first lowermost wafer of said stack onto said guide means while supporting the remainder of said stack of wafers, said wafer positioning means having means for holding a wafer thereon, a wafer driving means repetitively movable between a first and a second position, said wafer driving means moving a wafer on said guide means a predetermined distance in a first direction onto said wafer positioning means and into engagement with said wafer holding means, said control means moving said wafer positioning means so as to present different predetermined locations of said wafer lying in an area having a length parallel to said first direction approximately equal to said predetermined distance and with a width approximately equal to the width of said wafer to said securing station, said control means thereafter returning said wafer positioning means to said predetermined position, said wafer feeding means again moving a wafer on said guide means for causing said feeding means to drop the lowermost wafer of said stack onto said guide means after said motive means has presented the entire length of said wafer parallel to said first direction to said securing station, means comprising further electrical programming devices for controlling said motive means to position said wafer with respect to said stapling head at positions appropriate to selected ones of said components, and means for automatically controlling the operation of said devices in a predetermined time sequence such that stapling occurs only when a component has been supplied to said stapling head and said wafer is stationary.

20. The combination according to claim 5 wherein said wafer driving means comprises at least one pair of arms rotatable about a common axis perpendicular to their direction of movement, means for rotating said arms to a first position when in said first position, means for rotating said arms to a second position when said wafer has attained said predetermined position and said arms are displaced from their first position, said control means moving said coupling means into driving engagement when said arms are rotated to said second position.

21. The combination according to claim 5 wherein said feeding means comprises a pair of slides movable between first and second positions, means responsive to movement of said slides to feed a wafer, said slides being coupled to said wafer driving means by said control means.

22. The combination according to claim 21 wherein said feeding means further comprises at least one cam means carried by each of said slides, a plurality of opposed reciprocatable cam follower plates disposed along opposite edges of said wafers, one of said pairs of cam follower plates disposed under the lowermost wafer of said stack, another of said pairs of cam follower plates between aligned with the second lowermost wafer of said stack, said cam means first causing said another of said cam follower plates to engage said second lowermost wafer and then causing said one of said pairs of cam follower plates to be withdrawn from under said lowermost wafer upon movement of said slides with said coupling means.

23. An apparatus for successively feeding wafers to a wafer receiving device and for moving said wafer receiving means to present predetermined locations on said wafer to a utilization device, said apparatus comprising a guide means for said wafers, means for dropping a first lowermost wafer of said stack onto said guide means while supporting the remainder of said stack of wafers, wafer driving means repetitively movable between a first and a second position, said wafer driving means moving a wafer on said guide means a predetermined distance "a" toward said wafer receiving device upon each movement of said wafer driving means from said first to said second position, and control means for causing said means for dropping to drop a second lowermost wafer onto said guide means in response to said first lowermost wafer obtaining a predetermined position relative to said guide means, the predetermined distance being at the maximum approximately equal to the length of the wafers along their direction of movement by said wafer feeding means and at the minimum equal to a submultiple of said length, and means for intermittently and selectively moving said wafer receiving device to predetermined locations spaced from an initial position by a distance approximately equal to $$\frac{ma}{n}$$

where $n$ is an integer and $m$ is an integer from one to "$n$."

24. The combination according to claim 23, further comprising means for returning said wafer receiving device to said initial position after traversing a distance equal to "$a$."

References Cited in the file of this patent

UNITED STATES PATENTS

| | | |
|---|---|---|
| 622,749 | Worsley | Apr. 11, 1899 |
| 1,150,240 | Avery | Aug. 17, 1915 |
| 1,340,594 | Biggert | May 18, 1920 |
| 1,742,371 | Simmons | Jan. 7, 1930 |
| 1,756,614 | Wiener | Apr. 29, 1930 |
| 2,075,795 | Babcock | Apr. 6, 1937 |
| 2,521,227 | Kelly | Sept. 5, 1950 |
| 2,730,268 | Modesch | Jan. 10, 1956 |
| 2,747,188 | Greener | May 29, 1956 |
| 2,893,009 | Bergsland | July 7, 1959 |